(12) United States Patent
Provancher

(10) Patent No.: US 10,191,549 B2
(45) Date of Patent: Jan. 29, 2019

(54) MULTIDIRECTIONAL CONTROLLER WITH SHEAR FEEDBACK

(71) Applicant: The University of Utah Research Foundation, Salt Lake City, UT (US)

(72) Inventor: William R. Provancher, Fremont, CA (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 15/043,112

(22) Filed: Feb. 12, 2016

(65) Prior Publication Data

US 2016/0342209 A1 Nov. 24, 2016

Related U.S. Application Data

(63) Continuation of application No. 13/269,948, filed on Oct. 10, 2011, now Pat. No. 9,268,401, which is a continuation-in-part of application No. 12/182,906, filed on Jul. 30, 2008, now Pat. No. 9,285,878.

(60) Provisional application No. 60/962,649, filed on Jul. 30, 2007, provisional application No. 61/404,808, (Continued)

(51) Int. Cl.
| | |
|---|---|
| *A63F 13/06* | (2006.01) |
| *G06F 3/01* | (2006.01) |
| *G06F 3/0338* | (2013.01) |
| *A63F 13/24* | (2014.01) |
| *A63F 13/285* | (2014.01) |
| *G06F 3/0481* | (2013.01) |

(52) U.S. Cl.
CPC .............. *G06F 3/016* (2013.01); *A63F 13/24* (2014.09); *A63F 13/285* (2014.09); *G06F 3/0338* (2013.01); *G06F 3/04815* (2013.01); *G06F 2203/013* (2013.01); *G06F 2203/015* (2013.01)

(58) Field of Classification Search
CPC ...................................................... A63F 13/06
See application file for complete search history.

(56) References Cited

U.S. PATENT DOCUMENTS

| | | |
|---|---|---|
| 4,540,979 A | 9/1985 | Gerger |
| 4,584,510 A | 4/1986 | Hollow |
| 4,591,868 A | 5/1986 | Cusey |
(Continued)

FOREIGN PATENT DOCUMENTS

| | | |
|---|---|---|
| JP | 2005-129044 | 5/2005 |
| KR | 20-0222674 | 5/2001 |
(Continued)

OTHER PUBLICATIONS

Abbott, Jake et al., "Haptic Virtual Fixtures for Robot-Assisted Manipulation" *Department of Mechanical Engineering*, The Johns Hopkins University, 2007, 11 pages.
(Continued)

*Primary Examiner* — Omkar Deodhar
(74) *Attorney, Agent, or Firm* — Workman Nydegger

(57) ABSTRACT

A multidirectional control system with shear feedback, comprising at least one stationary body, a plurality of tactors disposed within the at least one movable body or the at least one stationary body. In some embodiments, a moveable body is included, such that the tactors have at least one degree of freedom of motion with respect to the stationary body or the moveable body within which they are disposed and are operable to engage target areas of a user's skin; and a plurality of actuators capable of moving the tactors.

8 Claims, 17 Drawing Sheets

Related U.S. Application Data filed on Oct. 8, 2010, provisional application No. 61/404,811, filed on Oct. 8, 2010.

(56) References Cited

U.S. PATENT DOCUMENTS

| | | |
|---|---|---|
| 5,028,093 A | 7/1991 | Nason |
| 5,184,319 A | 2/1993 | Kramer |
| 5,261,266 A | 11/1993 | Lorenz |
| 5,273,384 A | 12/1993 | Dunbar |
| 5,451,924 A | 9/1995 | Massimino |
| 5,587,937 A | 12/1996 | Massie |
| 5,589,828 A | 12/1996 | Armstrong |
| 5,625,576 A | 4/1997 | Massie |
| 5,631,861 A | 5/1997 | Kramer |
| 5,694,013 A | 12/1997 | Stewart |
| 5,709,219 A | 1/1998 | Chen |
| 5,721,405 A | 2/1998 | Hamada |
| 5,752,795 A | 5/1998 | D'Adamo |
| 5,765,791 A | 6/1998 | Givanetti |
| 5,767,796 A | 6/1998 | Van Roekel |
| 5,786,997 A | 7/1998 | Hoyt |
| 5,898,599 A | 4/1999 | Massie |
| 5,982,696 A | 11/1999 | Rao |
| 6,042,555 A | 3/2000 | Kramer |
| 6,135,691 A | 10/2000 | Nadarajah |
| 6,158,933 A | 12/2000 | Nicholson |
| 6,184,868 B1 | 2/2001 | Shahoian |
| 6,208,328 B1 | 3/2001 | Kawachiya |
| 6,236,306 B1 | 5/2001 | Liebelt |
| 6,246,391 B1 | 6/2001 | Ong |
| 6,330,837 B1 | 12/2001 | Charles |
| 6,388,655 B1 | 5/2002 | Leung |
| 6,417,638 B1 | 7/2002 | Rodomista |
| 6,418,362 B1 | 7/2002 | St. Pierre |
| 6,494,658 B1 | 11/2002 | Roy |
| 6,535,806 B2 | 3/2003 | Millsap |
| 6,565,059 B1 | 5/2003 | Falconer |
| 6,691,972 B1 | 2/2004 | Oliver |
| 6,693,516 B1 | 2/2004 | Vincent |
| 6,693,622 B1 | 2/2004 | Shahoian |
| 6,697,044 B2 | 2/2004 | Shahoian |
| 6,703,999 B1 | 3/2004 | Iwanami |
| 6,788,999 B2 | 9/2004 | Green |
| 6,793,234 B2 | 9/2004 | Carlstedt |
| 6,808,350 B1 | 10/2004 | Tooman |
| 6,859,819 B1 | 2/2005 | Rosenberg |
| 6,930,590 B2 | 8/2005 | Ling |
| 6,961,644 B2 | 11/2005 | Mercier |
| 6,982,696 B1 | 1/2006 | Shahoian |
| 6,995,745 B2 | 2/2006 | Boon |
| 7,044,021 B2 | 5/2006 | Lorenz |
| 7,077,015 B2 | 7/2006 | Hayward |
| 7,084,854 B1 | 8/2006 | Moore |
| 7,152,331 B2 | 12/2006 | Nakamura |
| 7,196,688 B2 | 3/2007 | Schena |
| 7,209,118 B2 | 4/2007 | Shahoian |
| 7,215,320 B2 | 5/2007 | Takeuchi |
| 7,242,112 B2 | 7/2007 | Wolf |
| 7,271,707 B2 | 9/2007 | Gonzales |
| 7,333,088 B2 | 2/2008 | Boon |
| 7,339,574 B2 | 3/2008 | Kyung |
| 7,450,110 B2 | 11/2008 | Shahoian |
| 7,565,180 B2 | 7/2009 | Tsai |
| 7,603,214 B2 | 10/2009 | Tanaka |
| 7,605,694 B2 | 10/2009 | Prost-Fin |
| 7,607,087 B2 | 10/2009 | Prados |
| 7,683,735 B2 | 3/2010 | Shibahara |
| 7,692,552 B2 | 4/2010 | Harrington |
| 7,710,279 B1 | 5/2010 | Fields |
| 8,004,052 B2 | 8/2011 | Vaganov |
| 8,011,234 B2 | 9/2011 | Kandler |
| 8,026,798 B2 | 9/2011 | Makinen |
| 8,125,453 B2 | 2/2012 | Shahoian |
| 8,326,462 B1 | 12/2012 | Provancher |
| 8,610,548 B1 | 12/2013 | Provancher |
| 8,994,665 B1 | 3/2015 | Provancher |
| 2001/0000663 A1 | 5/2001 | Shahoian et al. |
| 2001/0026264 A1 | 10/2001 | Rosenberg |
| 2001/0052893 A1 | 12/2001 | Jolly |
| 2002/0033795 A1 | 3/2002 | Shahoian |
| 2002/0068605 A1 | 6/2002 | Stanley |
| 2002/0142701 A1 | 10/2002 | Rosenberg |
| 2002/0145512 A1 | 10/2002 | Sleichter |
| 2003/0016207 A1 | 1/2003 | Tremblay |
| 2004/0010346 A1 | 1/2004 | Stewart |
| 2004/0025624 A1 | 2/2004 | Kreuzer |
| 2004/0040805 A1 | 3/2004 | Bailey |
| 2004/0060807 A1 | 4/2004 | Nishimoto |
| 2004/0095369 A1 | 5/2004 | Takeuchi |
| 2004/0104887 A1 | 6/2004 | Tsukamot |
| 2004/0106916 A1 | 6/2004 | Quaid |
| 2004/0117084 A1 | 6/2004 | Mercier |
| 2004/0129552 A1 | 7/2004 | Nakade |
| 2004/0227727 A1 | 11/2004 | Schena |
| 2004/0237669 A1 | 12/2004 | Hayward |
| 2005/0021190 A1 | 1/2005 | Worrell |
| 2005/0052415 A1 | 3/2005 | Braun |
| 2005/0073195 A1 | 4/2005 | Popilek |
| 2005/0110754 A1 | 5/2005 | Harley |
| 2005/0110758 A1 | 5/2005 | Kyung |
| 2005/0222830 A1 | 10/2005 | Massie |
| 2005/0231686 A1 | 10/2005 | Rathjen |
| 2006/0115348 A1 | 6/2006 | Kramer |
| 2006/0185921 A1 | 8/2006 | Cieler |
| 2006/0192760 A1 | 8/2006 | Moore |
| 2006/0227065 A1 | 10/2006 | Yukawa |
| 2006/0115347 A1 | 11/2006 | Lee |
| 2006/0256075 A1 | 11/2006 | Anastas |
| 2007/0008083 A1 | 1/2007 | Berg |
| 2007/0091063 A1 | 4/2007 | Nakamura |
| 2007/0100523 A1 | 5/2007 | Trachte |
| 2007/0146317 A1 | 6/2007 | Schena |
| 2007/0241595 A1 | 10/2007 | Nathan |
| 2007/0265077 A1 | 11/2007 | Tom |
| 2007/0299580 A1 | 12/2007 | Lin |
| 2008/0024284 A1 | 1/2008 | Baratoff |
| 2008/0088582 A1 | 5/2008 | Prest |
| 2008/0111791 A1 | 5/2008 | Nikittin |
| 2008/0120029 A1 | 5/2008 | Zelek |
| 2008/0174415 A1 | 7/2008 | Tanida et al. |
| 2008/0192002 A1 | 8/2008 | Funch |
| 2008/0193260 A1 | 8/2008 | Yokokohji |
| 2009/0036212 A1 | 2/2009 | Provancher |
| 2009/0096746 A1 | 4/2009 | Kruse |
| 2009/0160770 A1 | 6/2009 | Shahoian |
| 2009/0179854 A1 | 7/2009 | Weber |
| 2009/0278798 A1 | 11/2009 | Kim |
| 2010/0070254 A1 | 3/2010 | Tsai |
| 2011/0032090 A1 | 2/2011 | Provancher |
| 2011/0115754 A1 | 5/2011 | Cruz-Hernandez |
| 2012/0038468 A1 | 2/2012 | Provancher |
| 2012/0122062 A1 | 5/2012 | Yang |

FOREIGN PATENT DOCUMENTS

| | | |
|---|---|---|
| WO | 2000058819 | 10/2000 |
| WO | 2001091100 | 11/2001 |
| WO | 2003012557 | 2/2003 |
| WO | 2006115347 | 11/2006 |
| WO | 2009018330 | 2/2009 |
| WO | 2009129287 | 10/2009 |
| WO | 2012048325 | 4/2012 |

OTHER PUBLICATIONS

Arai, Fumihito et al., "Tactile Display Which Presents Shear Deformation on Human Finger" *Proceedings of the 2001 IEEE International Conference on Robotics and Automation* May 21-26, 2001.

Cavusolgu, M. Cent, et al., "Robotics for Telesurgery: Second Generation Berkely/UCSF Laparoscopic Telesurgical Workstation and Looking Towards the Future Applications" *Special Issue on Medical Robotics*, Jan. 2003, vol. 30, No. 1, 11 pages.

(56) References Cited

OTHER PUBLICATIONS

Dominquz-Garcia, Alejandro D. et al., "Haptic Interface for Automotive Steer-by-Wire Systems" Massachusetts Institute of Technology, Laboratory for Electromagnetic and Electronic Systems. Abstract 2006. 1 page.
Drewing, Knut et al., "First Evaluation of Novel Tactile Display Exerting Shear Force via Lateral Displacement" *ACM Transactions on Applied Perception*, vol. 2, Apr. 2005, pp. 118-131.
European Search Report for EP08782519 dated Feb. 28, 2013.
European Search Report for EP11831749.4 dated Mar. 1, 2017.
Fritschi, et al., "Integration of Kinesthetic and Tactile Display—A Module Design Concept," *Max-Planck Institute for Biological Cybernetics*, Germany 6 pages 2006.
Hayward, Vincent et al., "Tactile Display Device Using Distributed Lateral Skin Stretch" *Department of Electrical Engineering Center for Intelligent Machies*, McGill University. 2003, pp. 261-275.
International Search Report and Written Opinion for PCT/US2008/071574 dated Mar. 18, 2009.
International Search Report and Written Opinion for PCT/US2011/055633 dated Mar. 27, 2012.
International Search Report and Written Opinion for PCT/US2013/032053 dated Jul. 25, 2013.
Kahol, Kanav et al., "Tactile Cueing Haptic Visulatization" Center for Cognitive Ubiquitous Computing, *Arizona State University*, Tempe Arizona, 2005. 4 pages.
Kim, Youn et al., "Hand-Writing Rehabilitation in the Haptic Virtual Environment" *IEEE*, 2006, pp. 161-164.
Lam, Paul et al., "A Haptic-Robotic Platform for Upper-Limb Reaching Stroke Therapy: Preliminary Design and Evaluation Results" *Journal of NeuroEngineering and Rehabilitation*, May 22, 2008, 13 pages.
Levesque, Vincent et al., "Experimental Evidence of Lateral Skin Strain During Tactile Exploration", Center for Intelligent Machines, Department of Electrical and Computer Engineering, McGill University, 2003, 15 pages.
Maclean, Karon, "Haptics and the User Interface" www.cs.ubc.ca/~maclean/publics/ 27 pages Mar. 2, 2008.
Mali, Uros et al., "HIFE-Haptic Interface for Finger Exercise" *IEEE*, Feb. 2006, vol. 11, No. 1, pp. 93-102.
Morris, Aaron et al., "A Robotic Walker that Provides Guidance" *School of Computer Science, Carnegie Mellon University*, Pittsburg, PA 2003, 6 pages.
Mullins, James et al., "Haptic Handwriting Aid for Training and Rehabilitation" 5 pages Oct. 2005.
Phantom Desktop Haptic Device, *SensAble Technologies, Inc.* Jan. 6, 2006, 1 page.
Phantom Premium 1.5/6DOF, 1.5 Highforce/6DOF and 3.0/6DOF Haptic Devices, 42 pages, Available at least as early as Jul. 24, 2012.
Rabin, Ely et al., "Haptic Stabilization of Posture: Changes in Arm Proprioception and Cultaneous Feedback for Different Arm Orientations" *The American Physiological Society*, 1999, pp. 3541-3549.
Raisamo, Roope et al., "Haptic User Interfaces" Power Point Presentation. 2007, 10 pages.
Rassmus-Grohn, Kirsten, "Enabling Audio-Haptics" *Certec, Lund* 2006, 126 pages.
Salada, Mark et al., "Fingertip Haptics: A Novel Direction in Haptic Display" *Northwestern University, Department of Mechanical Engineering and Department of Psychology*. 2002. 10 pages.
Sallnas, Eva-Latta, "Supporting presence in Collaborative Environments by Haptic Force Feedback" *ACM Transactions on Computer-Human Interaction*, Dec. 2000, vol. 7, No. 4, pp. 461-476.
Scheibe, R.; Moehring, M.; Froehlich, B., "Tactile Feedback at the Finger Tips for Improved direct interaction in Immersive Environments," 3D User Interfaces, 2007. 3DUI '07. IEEE Symposium on, Mar. 10-11, 2007.
Sjostrom, Calle et al., "The sense of Touch Provides New Computer Interaction Techniques for Disable People" *Technology and Disability*, 1999, pp. 45-52.
Steele, Micah et al., "Shared Control Between Human and Machine: Using a Haptic Steering Wheel to Aid in Land Vehicle Guidance." *University of Michigan*, Ann Arbor, MI. 2001. 5 pages.
U.S. Appl. No. 12/182,906, Mar. 29, 2011, Office Action.
U.S. Appl. No. 12/182,906, Sep. 19, 2011, Final Office Action.
U.S. Appl. No. 12/402,067, Aug. 3, 2012, Notice of Allowance.
U.S. Appl. No. 12/699,494, Jan. 28, 2013, Office Action.
U.S. Appl. No. 13/269,948, Mar. 15, 2013, Office Action.
U.S. Appl. No. 12/699,494, May 16, 2013, Notice of Allowance.
U.S. Appl. No. 12/699,494, Aug. 14, 2013, Notice of Allowance.
U.S. Appl. No. 13/269,948, Sep. 27, 2013, Final Office Action.
U.S. Appl. No. 12/949,303, Oct. 15, 2013, Office Action.
U.S. Appl. No. 13/041,169, Oct. 17, 2013, Office Action.
U.S. Appl. No. 12/182,906, Apr. 7, 2014, Office Action.
U.S. Appl. No. 12/949,303, May 22, 2014, Office Action.
U.S. Appl. No. 13/041,169, Jun. 17, 2014, Final Office Action.
U.S. Appl. No. 13/269,948, Jul. 17, 2014, Office Action.
U.S. Appl. No. 12/182,906, Oct. 24, 2014, Final Office Action.
U.S. Appl. No. 12/949,303, Dec. 2, 2014, Notice of Allowance.
U.S. Appl. No. 13/041,169, Dec. 2, 2014, Office Action.
U.S. Appl. No. 12/949,303, Mar. 3, 2015, Notice of Allowance.
U.S. Appl. No. 13/269,948, Mar. 13, 2015, Office Action.
U.S. Appl. No. 12/182,906, Apr. 8, 2015, Office Action.
U.S. Appl. No. 13/269,948, Oct. 14, 2015, Notice of Allowance.
U.S. Appl. No. 12/182,906, Nov. 9, 2015, Notice of Allowance.

MULTIDIRECTIONAL CONTROLLER WITH SHEAR FEEDBACK

CROSS-REFERENCE TO RELATED APPLICATIONS

This application is a continuation of U.S. patent application Ser. No. 13/269,948, filed Oct. 10, 2011, which is a continuation-in-part of an earlier filed U.S. patent application Ser. No. 12/182,906, filed Jul. 30, 2008 which claims the benefit of U.S. Provisional Patent Application No. 60/962,649, filed Jul. 30, 2007, the entireties of which are incorporated by reference. U.S. patent application Ser. No. 13/269,948, filed Oct. 10, 2011 also claims the benefit of and priority to U.S. Provisional Patent Application No. 61/404,808, filed Oct. 8, 2010, which is incorporated by reference in its entirety. U.S. patent application Ser. No. 13/269,948, filed Oct. 10, 2011 also claims the benefit of and priority to U.S. Provisional Patent Application No. 61/404,811, filed Oct. 8, 2010, which is incorporated by reference in its entirety.

STATEMENT REGARDING FEDERALLY SPONSORED RESEARCH

This invention was made with government support under Grant #11S0746914 awarded by the National Science Foundation. The government has certain rights in this invention.

FIELD OF THE INVENTION

The present disclosure relates generally to haptic feedback devices and more specifically to the devices that can provide tactile shear feedback.

BACKGROUND OF THE INVENTION

The field of haptics is the science of interfacing with users via the sense of touch by applying forces, vibrations, or motions to a user. Haptic devices are increasingly used to provide user with sensory input that conveys information about the surrounding environment. A common example of a haptic device is the game stick (or "joystick") controller sold by Nintendo under the trade name "Rumble Pak." This haptic device produces vibratory motion at various times during gameplay to provide the player, through his or her sense of touch, with information relating to a scenario of the game (e.g., when he fires a weapon in the game). Haptic devices are also recognized as an integral part of virtual reality systems, which attempt to simulate situations or sensations participant "experiences" in the virtual environment.

While haptic devices have been produced for a variety of uses, many technological hurdles remain. For example, difficulties with isolating the sensory input to a discrete area of the user's body remain largely unaddressed.

SUMMARY OF THE INVENTION

In one implementation, this invention includes a multidirectional controller with shear feedback, comprising a stationary body, a movable body, a tactor, and an actuator capable of moving the tactor. The tactor may be disposed in connection with the movable body or the stationary body, such that it has at least one degree of freedom of motion with respect to the body in connection with which it is disposed. The tactor may also be operable to engage a target area of a user's skin.

In another implementation, the invention includes a multidirectional controller with shear feedback, comprising at least one stationary body, at least one movable body, and a plurality of tactors that may be disposed in connection with at least one movable body or at least one stationary body, such that the tactors have at least one degree of freedom of motion with respect to the body in connection with which they are disposed. The tactors may be operable to engage target areas of a user's skin. The multidirectional controller may also comprise at least one actuator capable of moving the tactors.

In yet another implementation of the invention, the multi directional controller with shear feedback may comprise at least one tactor operable to engage a target area on a user's skin and at least one sensor capable of detecting a change in position of and/or force applied to at least one tactor. The multidirectional controller with shear feedback may also comprise at least one actuator capable of moving at least one tactor. Additionally, the above system may comprise at least one computer system capable of receiving information from at least one sensor and sending instructions to at least one actuator.

The present invention also relates to a method of providing directional feedback to a user of a multidirectional control system without affecting control function. The method may comprise two steps: (1) providing a user with a multidirectional controller; and (2) directing the computer system to instruct at least one tactor to move from an original location to an instructed location, such that the direction of a vector determined by the original location and the instructed location of the tactor is the direction that corresponds to the directional feedback intended to be provided to the user.

BRIEF DESCRIPTION OF THE DRAWINGS

Features and advantages of the embodiments of this disclosure will be apparent from the detailed description that follows, and which taken in conjunction with the accompanying drawings and attachments together illustrate and describe exemplary features of the disclosure herein. It is understood that these drawings merely depict exemplary embodiments and are not to be considered limiting the scope of the invention. Additionally, it should be understood that the scale may be varied and the illustrated embodiments are not necessarily drawn to scale for all embodiments encompassed herein.

Furthermore, it will be readily appreciated that the components of the illustrative embodiments, as generally described and illustrated in the figures herein, could be arranged and designed in a wide variety of different configurations, and that components within some figures are interchangeable with, or may supplement, features and components illustrated in other figures. Nonetheless, various particular embodiments of this disclosure will be described and explained with additional specificity and detail through the use of the accompanying drawings, in which.

DETAILED DESCRIPTION

Figure 1:
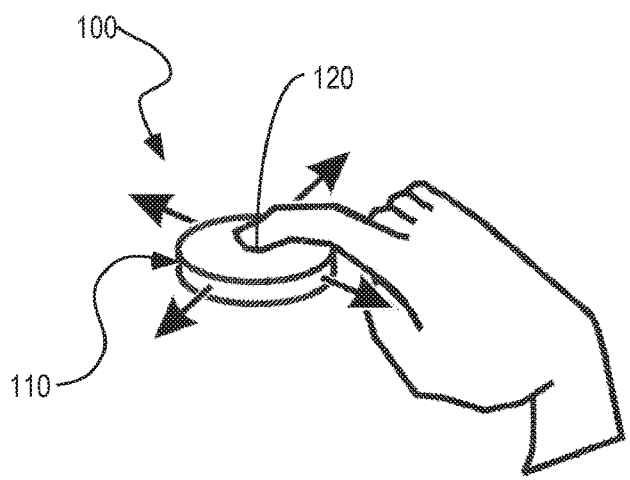
FIG. 1 is a perspective view of a schematic representation of a shear feedback system in accordance with an embodiment of the invention.

The embodiments described herein generally extend to devices and methods for providing shear feedback to a user of a multidirectional controller. Shear feedback is the application of force that results in stretching or pulling (or possibly pinching) of a user's skin. Such application of force will tend to generate tensile stress on a trailing edge of the skin being targeted ("target area") and a compressive stress on a leading edge of the skin. If pinching of the skin occurs, this increases compressive stresses on the leading edge of the skin. Shear forces can also be applied to the skin while sliding a tactor across the skin (i.e., with some slip between the tactor and the targeted skin).

Application of shear forces is distinct from application of kinesthetic forces, as that term is understood by those of ordinary skill in the art. As one example, the application of shear force to a user's finger pad by moving a shear plate transverse to the user's finger pad (thereby causing local skin deformations) is to be distinguished from the kinesthetic forces and motions experienced by a user as a stylus or other device is applied to a user's fingers or hand causing (or tending to cause) motion of the finger, hand, and/or arm joints. Local shear deformations in the skin from moving a shear plate transverse to the user's skin are also distinct from the forces experienced by a user when a device is merely vibrated to provide information to a user. Typically, application of a shear force requires relative movement of the user's target skin area (e.g., finger pad or palm) relative to a shear plate, which relationship can occur by way of movement of the target skin area, movement of the shear plate, or both. Typically speaking, however, relative transverse movement is required to apply the shear force that is reacted locally, whereas application of kinesthetic forces can be realized without locally reacted relative transverse motion, since the kinesthetic forces are reacted away from the target area of the skin.

This invention addresses challenges in providing shear feedback in multidirectional controllers. A multidirectional controller, generally, is a device that a user can manipulate in order to send signals or instructions to a controlled object. These signals or instructions may be communicated through mechanical or electromechanical means. For example, a multidirectional controller may have purely mechanical connections to the controlled object. Hence, a multidirectional controller may have mechanical links that exert force directly or indirectly (e.g., through a hydraulic system) on the controlled object. Common examples of a mechanical multidirectional controller include a stick shift (also known as gear stick) that is used to shift between gears of a manual transmission and a steering wheel of an automobile. An electromechanical multi directional controller may first send signals or instructions to a computer system, which subsequently translates them to the controlled object. A common example of an electromechanical multidirectional controller is a joystick used in numerous applications, for example in video games. A computer system, as used herein, shall refer to any system or device capable of receiving, processing, and outputting electrical signals. Examples of common computer systems include personal computers, vehicle computers, machine automation controllers (e.g., controllers capable of sending instructions to servo or step motors), game consoles, and mobile devices (e.g., mobile phones, personal digital assistants, handheld video game systems).

Through experimentation, it was established that effectiveness of the transmission of various information depends on the shear feedback mechanism staying in contact with the target area on the user's skin as well as the stretching or deformation of the user's skin. Consequently, effectiveness of shear feedback provided to a user is related to effective isolation of the target area of user's skin that is in contact with the shear feedback mechanism and eliminating or minimizing forces on and movement in the user's joints.

Isolating an area of the user's skin adjacent to the target area is particularly challenging when the target area is on a part of the user's body that is in motion during the transmission of the shear feedback. For example, a finger on the user's hand that is in the process of manipulating a multidirectional controller may move during the process and lose contact with the shear feedback mechanism. Furthermore, motion of a shear feedback mechanism may dislodge the user's finger from the controller or, alternatively, move the controller away from the user's finger. Such motion may result not only in loss of information sent via a shear feedback mechanism but also in an unwanted motion of the controller with respect to the user's hand and/or an unwanted command sent through the controller. These issues can be addressed by providing a proper connection or restraint between the device and the skin of user's hand or fingers.

Some of the devices described herein are configured to restrain a portion of the user's skin adjacent to the target area, in order to improve the connection between the device and user's skin, and to better facilitate the saliency of shear feedback. Additionally, some of the described embodiments relate to restraining one or more target areas of the user's skin while the user is manipulating the multidirectional controller.

Furthermore, some of the described devices, and their obvious variants, can provide shear feedback in one or more direction and on one or more target area of the user's skin.

When reference is made to a portion of a user's skin "adjacent to a target area of the skin," it is to be understood that the adjacent portion of the skin can be immediately adjacent the target area of skin or the portion of the skin and may be relatively far removed from the target area.

As used herein, the term "well" refers to a type of restraint that may be used to immobilize an area of a user's skin that is adjacent to the skin in contact with a tactor. Generally, a well includes a window or other orifice through which a contact with a tactor can be felt by a user's skin. Immobilizing the user's skin provides enhances the sensation experienced by the user. A well provides restraint without preventing a user from removing their hand from the restraint, as might occur if strapping a device to a user's hand. Examples of wells include but are not limited to a thumb well, finger well, and palm well, which are described in more detail below. A saddle-like structure may also be used in combination with a well to produce a "saddle-configured well," which can provide improved connectivity between the user's skin and a shear display device. Additionally, simply gripping a device, within which a moving tactor assembly is embedded, can also provide restraint to a user's skin, as a substitute for or in addition to a well.

A general aspect of the invention is shown in FIG. 1, where it can be seen that an actuated tactor assembly 100 can include a tactor 110 that can be suitable for engaging a target area of a user's skin 120. The target area of the skin in this example being the pad of a finger in immediate contact with the tactor 110. As the tactor is moved transversely relative to the target area of skin (e.g., as indicated by the arrows in FIG. 1), a user experiences the sensation of a shear force or stroking motion being applied to the user's skin. In most aspects of the invention, the force applied to the user's skin is applied primarily in a transverse direction. The force applied to the user's skin will generally be in a direction indicated by the arrows. However, application along other directions is also possible.

Tactile feedback can be provided to a person's finger tip, hand, or other body surface in the form of shear motions and forces that can be sensed by cutaneous touch receptors of the skin. In some embodiments, the tactor can be stroked or slid over the finger or other surfaces of the body; shear motions and forces induce skin stretch, which results in increased perceived sensation.

Figure 2:
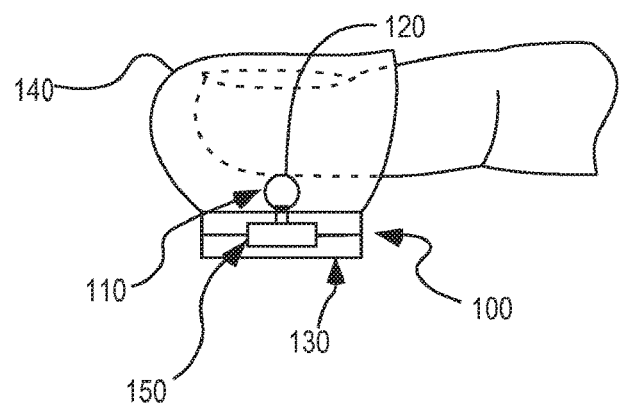
FIG. 2 is a partially sectioned view side of a compact tactile shear feedback device in accordance with one embodiment of the invention.

In one exemplary application, illustrated in FIG. 2, the system includes the tactor 110, and a base 130. The base can be configured to be coupled to an external support structure over which, or adjacent to which, the user can place his or her finger. In the embodiment shown, the base 130 is coupled to a thimble structure 140 that can be mountable over a finger of the user's hand. An actuation system 150 can move the tactor 110 relative to the target area of the skin 120.

Figure 3:
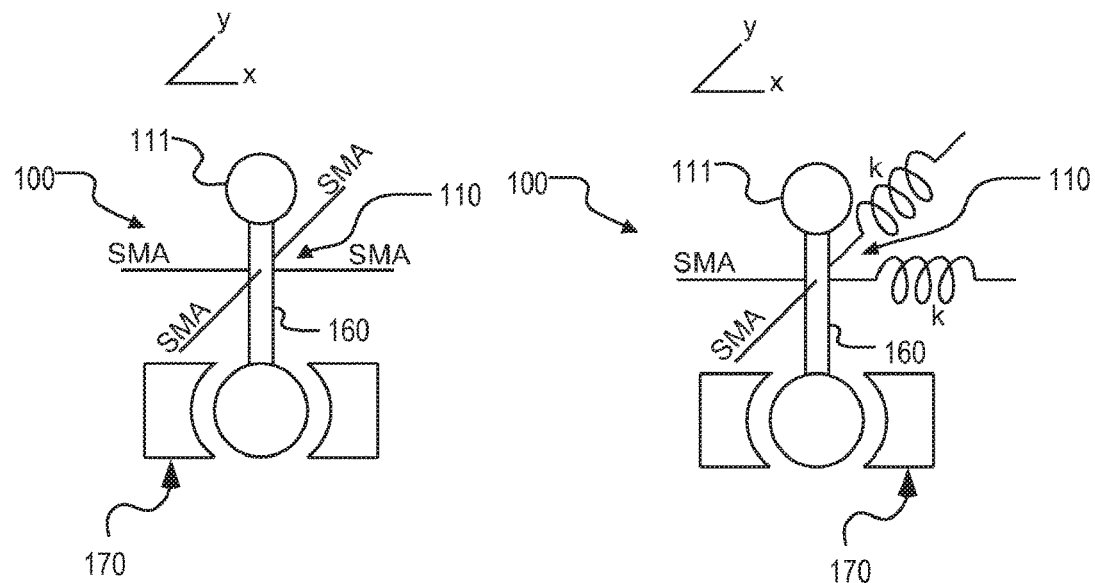
FIG. 3 includes two schematic views illustrating exemplary manners of actuating the shear tactor of the present invention.
Figure 4:
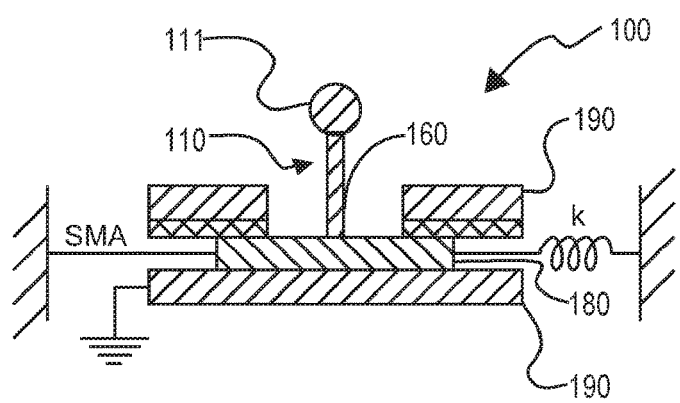
FIG. 4 is a schematic view illustrating the components of a compact tactile shear feedback device in accordance with an embodiment of the invention.
Figure 6:
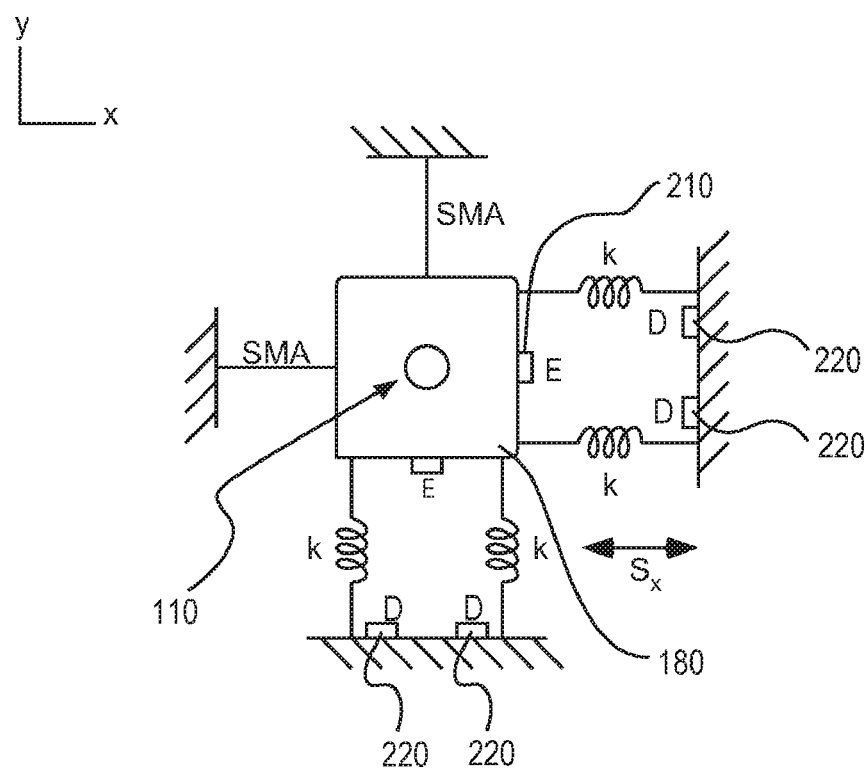
FIG. 6 is a schematic view of an exemplary control/sensing system in accordance with one aspect of the invention.
Figure 7:
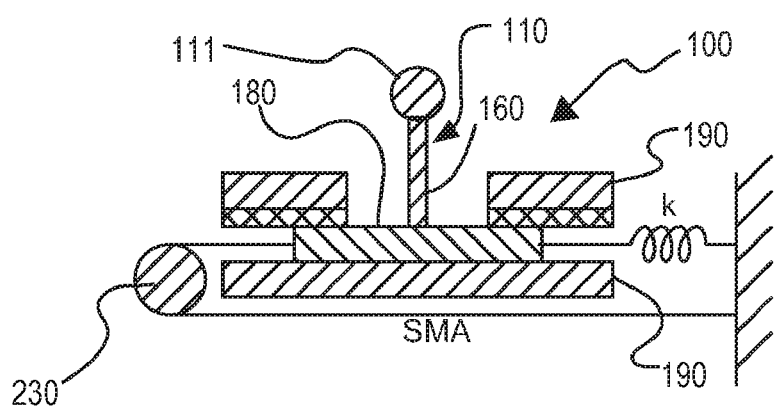
FIG. 7 is a schematic view of an exemplary actuated tactor assembly in accordance with one aspect of the invention.

Various exemplary actuation systems are illustrated in FIGS. 3, 4, 6, and 7. In one embodiment, as shown in FIG. 3, the tactor 110 can comprise a tactor pad 111 and rod 160, which rests in a spherical bearing 170, and can be actuated by Shape Memory Alloy ("SMA") devices known to those of ordinary skill in the art. In another embodiment, as shown in FIGS. 4, 6, and 7, the tactor 110 can be coupled to a bearing plate 180 that can be moved to achieve movement of the tactor 110. The bearing plate 180 can be supported by parallel plates that form a bearing housing 190. In the examples provided, various springs (shown with spring constants "k") and SMA devices coordinate to achieve movement of the tactor. The embodiments illustrated as cross-sectional views in FIGS. 4 and 7 are similar in operation, with embodiment shown in FIG. 7 including one or more pulleys 230, which enable(s) the use of SMA, while limiting overall size of the package of the system.

Methods of actuation will generally be compatible with a compact design and are also generally power efficient. Piezoelectric actuators or electromagnetic motors can be utilized in the actuation system; the use of Shape Memory Alloy (SMA) actuators is also particularly attractive from a packaging standpoint. The design of the shear feedback devices can be miniaturized and optimized for two or three axes of motion.

Figure 19:
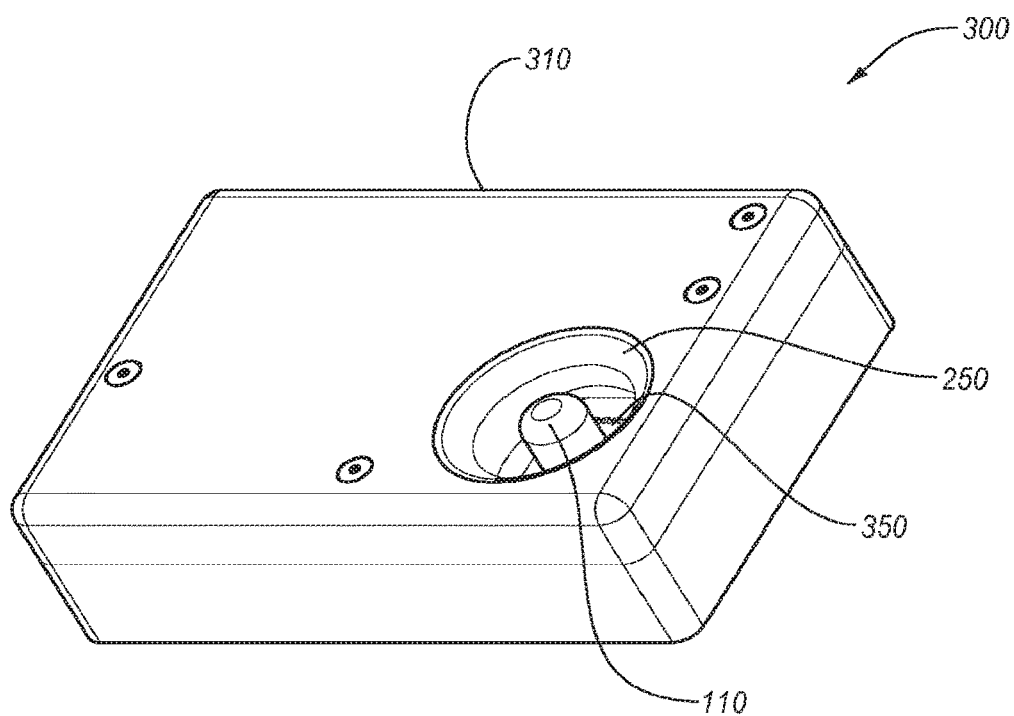
FIG. 19 illustrates an embodiment of an actuated tactor assembly having a force and/or displacement sensor(s).
Figure 19:
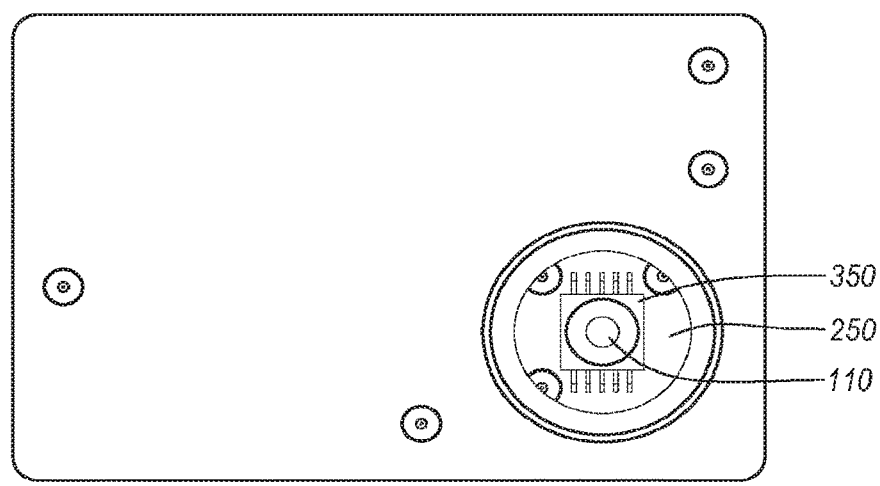
Figure 19A:
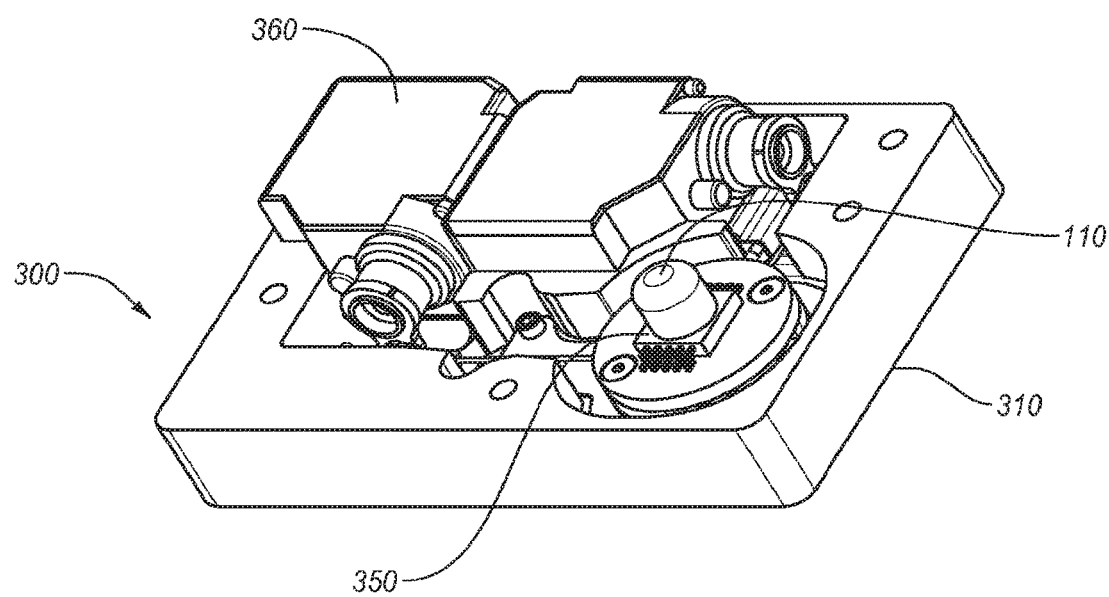
FIGS. 19A and 19B illustrate an embodiment of an actuated tactor assembly having a force and/or displacement sensor(s), with the outer housing removed to show details of the actuation mechanism.
Figure 19B:
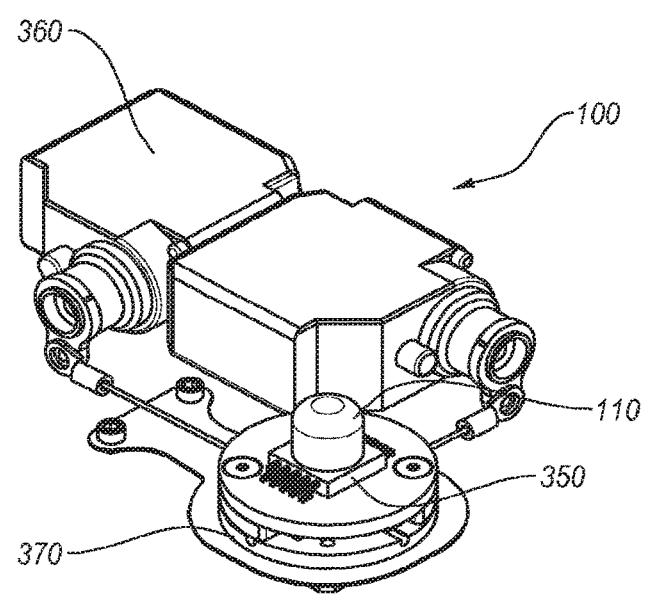

An embodiment of an actuated tactor assembly is portrayed in FIGS. 19, 19a, and 19b, which utilizes servo motors 360 to actuate a sliding plate assembly 370, and incorporates a force sensor 350 within the tactor 110.

Additionally, actuation of the tactor may be implemented in a manner described in U.S. patent application Ser. No. 12/699,494 which is incorporated by reference herein in its entirety.

The minimum motion capability for the device can be in the range of ±0.050 mm of motion on at least 1 axis. In one aspect of the invention, the range of motion of can be on the order of 0.05 mm to about 2 mm. In another aspect, the range can vary from a minimum of about 0.05 mm to about 1 mm. In one aspect of the invention, the motion of the tactor and the target area of skin is limited, restrained or restricted to less than 2 mm of total relative travel. In one aspect, the total relative travel is limited to 1 mm or less. In another embodiment, the total relative travel is limited to 5 mm or less.

The tactor pad 111 can have a variety of shapes and sizes and can include a substantially planar surface that contacts the target area or can include a rounded or curved or otherwise non-planar geometry. In the preferred embodiment, the tactor pad 111 has a cylindrical shape with a substantially hemispherical top surface, which contacts the target area of the skin 120. The top surface of the tactor pad 111 can be smooth, textured, or patterned with embossments and dimples of various shapes. Additionally, the tactor pad's top surface can be made of various materials known to those skilled in the art (e.g., nylon, polystyrene, neoprene, or other thermoplastic or thermosetting materials or elastomers) to facilitate a desired coefficient of friction, texture, feel, durability, and manufacturability of the tactor pad and/or its top surface.

The target area of the skin 120 can be sufficiently large to cause the user to experience the sense of shear forces acting on the target area. While the size of the target area of the skin 120 may vary, it must generally be large enough so that the user experiences more than a mere touching sensation; the user should be able to feel and discern that a shear force (or alternately they may discern a pinching of the skin) is being applied to the skin. In one aspect of the invention, the width or diameter of the tactor 110 and/or tactor pad 111 can be about 3 mm. In other implementations, the tactor 110 and/or tactor pad 111 can be about 7 mm. Additionally, in some embodiments, the diameter can be 15 mm. In compact applications, the width of the tactor 110 and/or tactor pad 111 can be greater than the height of the tactor 110 and/or tactor pad 111, respectively. In one embodiment, the distance from the bottom of the base 130 to the top surface of the tactor pad 111 (i.e., the height of the device) is less than about 13 mm. In other embodiments, the height can be about 38 mm. In one embodiment, a total package size of the device can be about 35 mm×35 mm. Thus, the shear feedback system can be formed in a relatively small package so as to be easily installable adjacent to structures over which a user typically places his or her hands or fingers, yet fully functional despite this small footprint.

Figure 5:
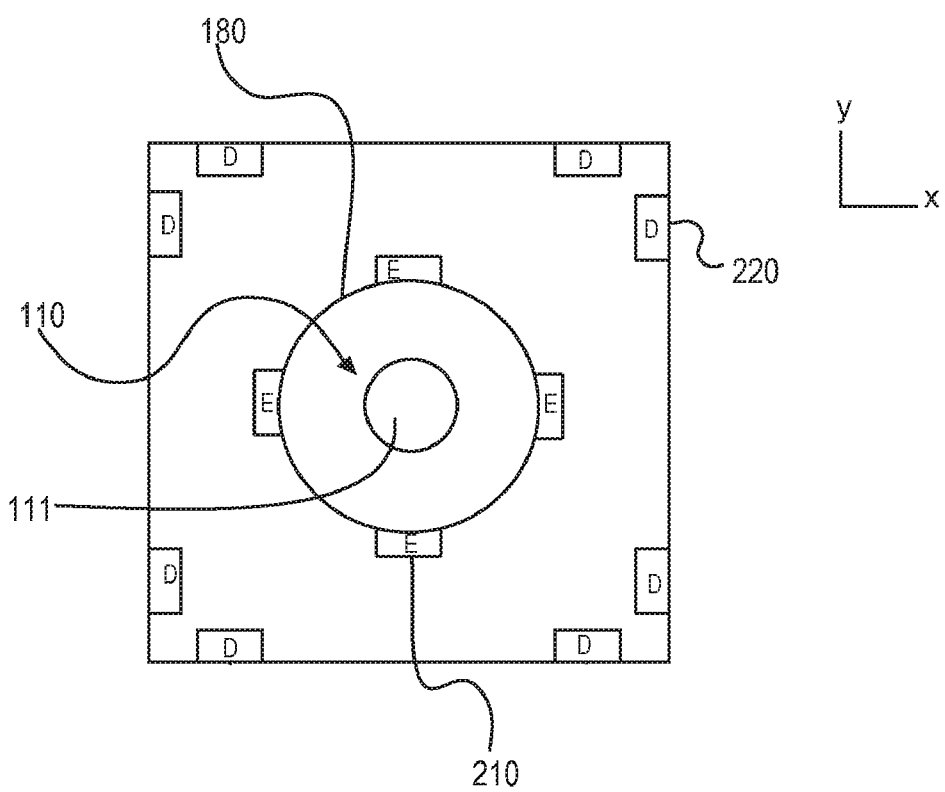
FIG. 5 is a schematic view of an exemplary sensing system in accordance with one aspect of the invention.

FIG. 5 illustrates an exemplary manner in which movement of the system can be measured using various emitters 210 and detectors 220. As the bearing plate 180 and tactor 110 are moved, the pairs of emitter and detectors can register the movement and can provide a corresponding signal to a computer system (not shown). This concept may be incorporated into the control/sensing system of FIG. 6. This embodiment utilizes principles similar to those outlined above, with the addition of a pair of springs opposing each SMA device to limit potential rotation of the bearing plate 180 during translational movement to reduce the potential of incorrect readings by the detectors 220 and emitters 210.

In some embodiments of the invention, the shear force can be applied in a variety of movement patterns. For example, the shear force can be applied intermittently, such that it would create a sensation of a stroking motion that may indicate direction. In this example, the tactor 110 can be moved once in one direction or can be moved backand-forth, with the movement one direction possibly differing in some aspect from the movement in the opposite direction. For example, the tactor 110 can be moved in one direction at a relatively high rate and "returned" to a null position by moving in the opposite direction at a relatively slower, less perceptible rate. This movement pattern can be repeated multiple times to provide the operator with the greatest opportunity to sense and correctly interpret the information being provided.

Figure 9:
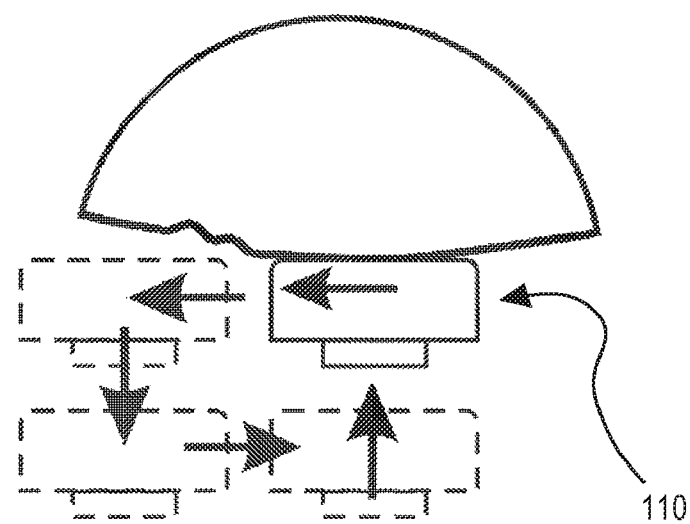
FIG. 9 is a schematic representation of an application of the present invention with a tactor capable of selectively breaking contact with the skin surface (the skin surface shown is a portion of a finger or a palm in this example).

Other exemplary movement patterns can include moving the tactor 110 in one direction while the tactor and the target area of skin 120 are in contact, then breaking contact between the target area of skin and the pad to return the pad to a null position. This aspect of the invention is illustrated by example in FIG. 9, where tactor 110 can move laterally to apply the shear force to the target area of skin 120, after which it can move normal to the skin (i.e., it can break contact with the skin), and return to a null position. Then, contact with the skin can be made again, and the shear force can again be applied to the skin (at either the same magnitude, velocity, etc., or at a differing magnitude, velocity, etc.). In this manner, the user does not necessarily sense the return movement of the pad, which otherwise may cause confusion on the direction being indicated. Contact between the tactor pad 111 and the target area of the skin 120 can be broken by either moving the pad normal to (and away from) the target area of skin, or by moving the target area of skin normal to (and away from) the tactor.

The effect of a stroking motion can also be achieved by actively varying the effective coefficient of friction of the tactor by vibrating the tactor with ultrasonic vibrations. By actively varying the friction between the tactor 110 and the target area of the skin 120, the tactor 110 may be moved in one direction at a relatively high friction level, and "returned" to a null position by moving in the opposite direction at a relatively lower, less perceptible friction level. This shear force or motion application pattern can be repeated to provide the operator with the greatest opportunity to sense and correctly interpret the information being provided.

The shear force or motion application pattern can be varied depending on the urgency of the information being conveyed to the user. For example, "non-critical" information can be provided with a signal of relatively slower or shorter displacement(s) of the tactor relative to the target area of skin. Such may be the case, if information were being provided to an operator of a vehicle who had not disengaged a turn signal after making a turn. Alternatively, "critical" information can be provided by a motion pattern with relatively increased magnitude or speed of the movement of the tactor 110.

Additionally or alternatively, one or more actuated tactor assembly can provide non-directional information or combination information, such as information consisting of multiple components. For example, a motion pattern, as described above, may provide information about the speed of a moving object (whether real or virtual) by alternating movements and the speed of the movements of a tactor. Additionally, direction of those movements may indicate the direction of the moving object. It is appreciated that other movement patterns may be used to indicate the speed of a moving object; for example, vibratory feedback through the tactor may also provide information about the speed of a moving object. Furthermore, by providing a user with information correlating the speed and/or frequency of tactor's movements with quantitative information about the speed of the moving object, the user may be trained to recognize and/or be able to estimate the speed of a moving object based on the tactile shear feedback pattern provided by the tactor. Information of a given magnitude, such as temperature, pressure, or altitude, may also be communicated through the position of the tactor. If the information to be communicated is vector-like in nature, that is it possesses a direction and magnitude, the scaled direction and magnitude of the tactor's position can be used to directly convey such information. Other non-directional information may also be conveyed to a user through tactor movement patterns. Examples of such information include information about surface roughness, vibrations, impact, warnings, completion of a task, and requests.

In some embodiments, the invention can be used to provide tactile feedback and to be used in combination with a commercial 3-D force feedback device, such as one sold under the trade name PHANToM, made by SensAble Technologies, or other similar commercial force feedback devices. For example, the invention can be used to replace PHANToM's current thimble interface.

In other embodiments, the shear feedback device can be added to enhance (or replace) the data input device used as the common computer "mouse." The shear feedback device can be used in combination with a finger-based touchpad and can be used to represent the current location of the computer cursor. Alternatively, the device could be used to transmit shearing motions to the skin of the fingerpad to suggest which direction the user should move their finger to attend to a particular task or application, thus providing attention cueing capability to the user.

Because of its compact design, the shear feedback device can be added to many current devices, and is suitable for applications in wearable or mobile computing. For example, it can be used as part of a gaming controller interface. The device is also well suited for applications which require communication of directional information. An example of this includes embedding several shear feedback device devices into a steering wheel to communicate information from a navigation system. The shearing force exerted on the user's skin in each of these applications can provide suggested direction cues to greatly enhance the ability of the user to operate the vehicle.

Figure 8:
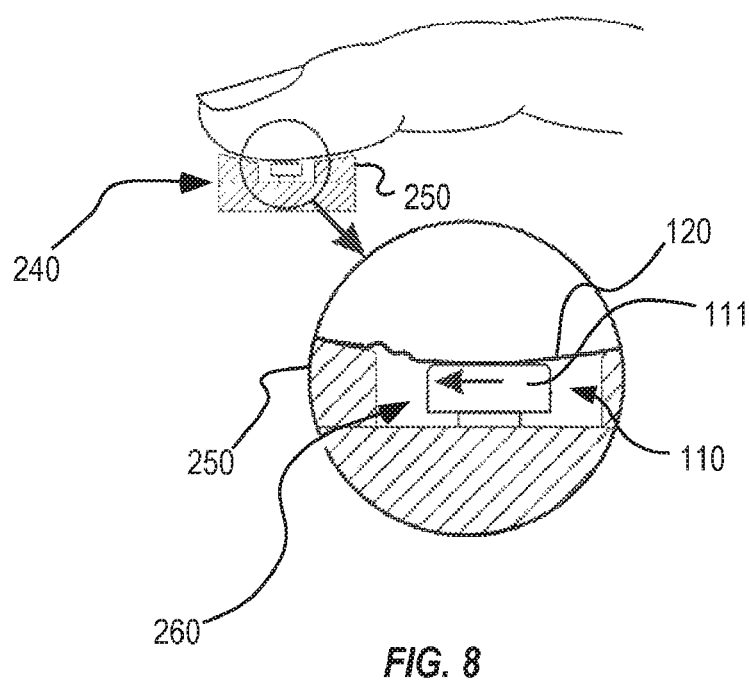
FIG. 8 is a schematic representation of an application of the present invention in use with a finger well.

FIG. 8 illustrates an embodiment of the invention that incorporates a well 250 including a recess 260 into a restraining structure 240. FIG. 8 depicts a well used specifically for restraining the motion of a finger, i.e., it is a finger well. A tactor 110 can be located or disposed within or adjacent to the well 250. The well 250 can serve as an indicator of the location of the tactor 110, so that a user can locate the tactor by touch. However, the well 250 need not coincide with the location of the tactor 110. The well 250 also serves as a restraining structure that restrains portions of the user's skin adjacent the target area of the skin 120, to better transmit shear forces to the target area. In addition, the well itself can also be independently actuated in two-dimensions relative to the restraining structure 240 (similar to the embodiment illustrated in FIG. 9, except that the well would move instead of, or in addition to, the tactor).

Figure 10:
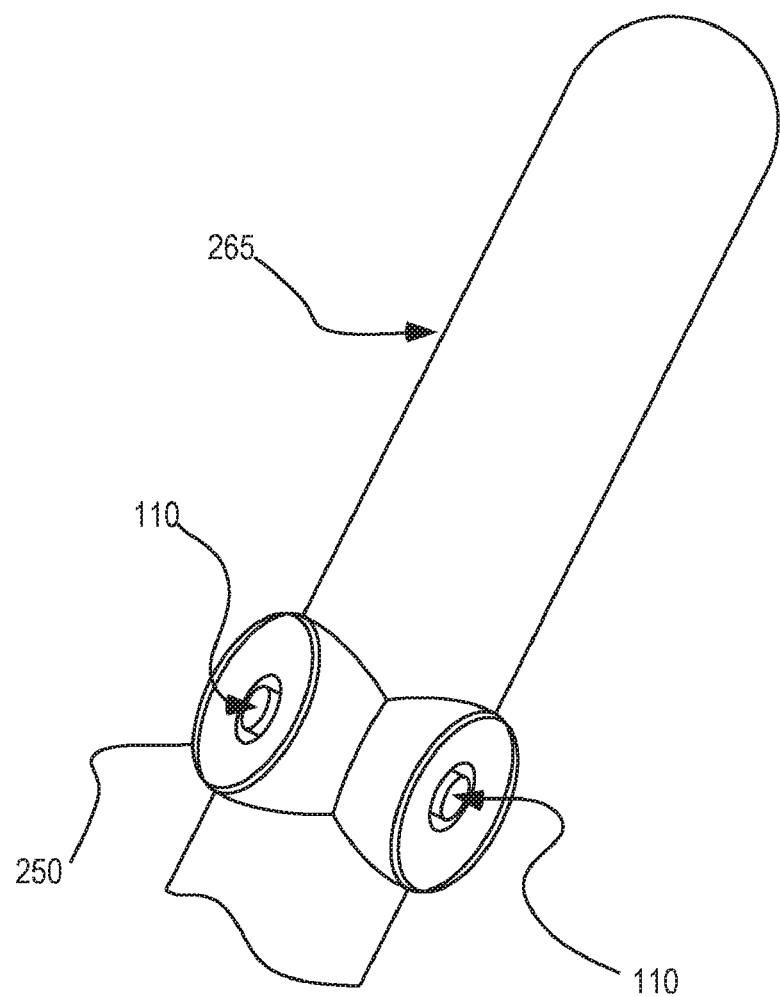
FIG. 10 is a schematic representation of an application of the present invention in use with finger wells coupled to or integrated with a stylus.
Figure 11:
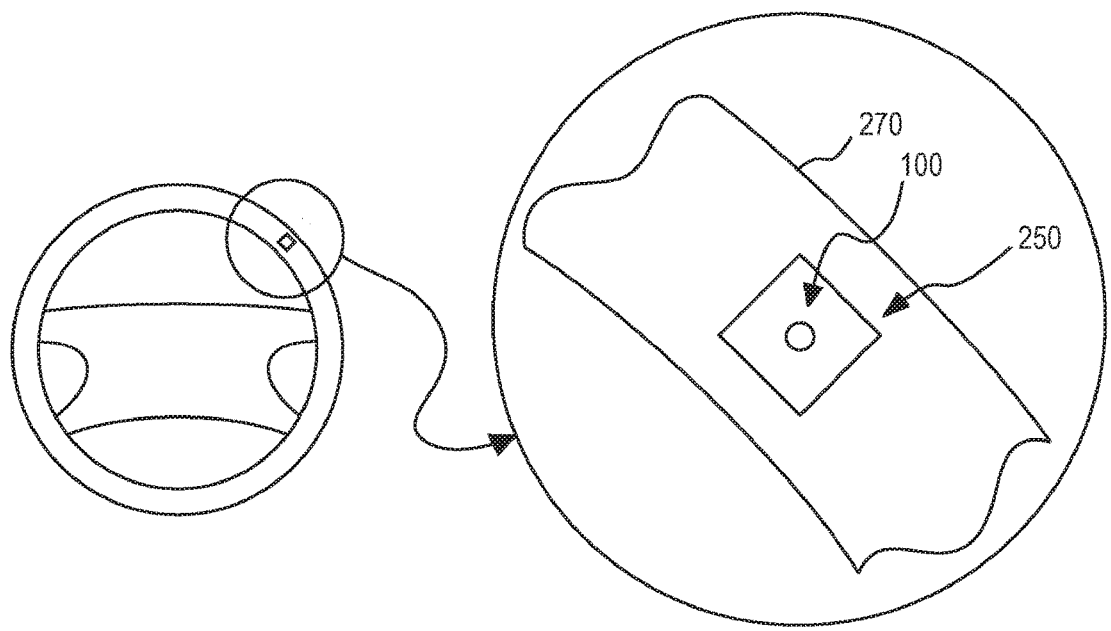
FIG. 11 illustrates an application of the present invention incorporated into a steering wheel.

The restraint structure 240 with which the well 250 can be associated can vary widely. In the embodiment shown in FIG. 10, two wells 250 are incorporated into a stylus 265 to enable tactors 110 to provide directional instruction or information to the user of the stylus. FIG. 11 illustrates an exemplary application of the present invention in use on a vehicle. In this embodiment, the well 250 can be installed on (or in) a steering wheel 270 to enable a tactor 110 or multiple tactors to provide directional commands to a driver through a tactile interface. Note that, in FIG. 11, the shear feedback device is indicated as installed in a location on the steering wheel facing the driver. In other applications, the shear feedback device will be installed on (or in) the steering wheel so as to face the dashboard and be accessible by fingertips of the user that are wrapped about the rear of the steering wheel. In this application, the shear feedback device can be utilized to provide tactile information to the user relating to a variety of differing aspects of operating the vehicle, including information relating to a direction of travel of the vehicle (including a direction of travel different than a present direction of travel), speed of the vehicle, and an incoming call on a vehicle communications device. Generally speaking, any type of information typically provided by way of auditory or visual stimulus can be presented to the vehicle's operator via the present shear feedback device.

Figure 12:
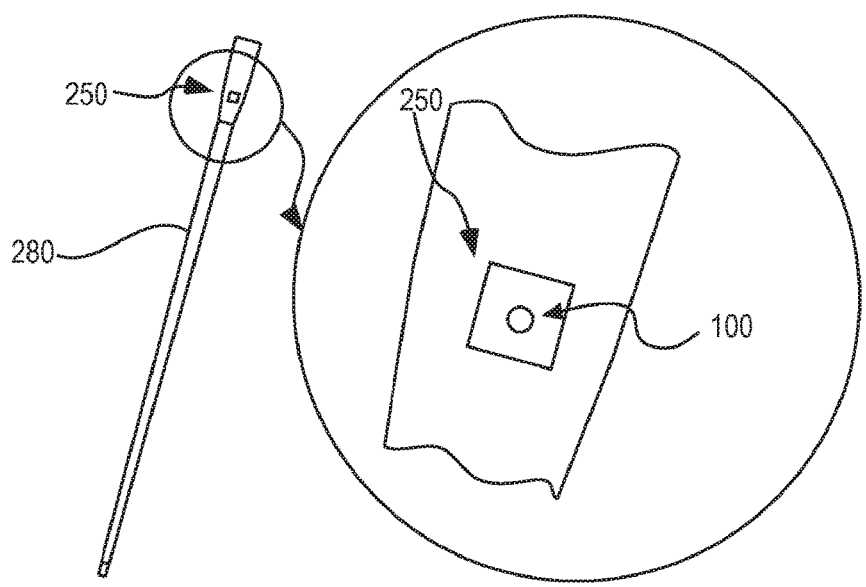
FIG. 12 illustrates an application of the present invention as incorporated into an ambulatory assist application (e.g., walking cane).

In a similar application illustrated in FIG. 12, the well 250 can be incorporated into a walking cane 280 utilized by the visually impaired to enable the actuated tactor assembly 100 to provide directional commands through a tactile interface, possibly alerting the visually-impaired user of the presence of an upcoming obstacle (and/or directing the user around the obstacle).

Figure 13:
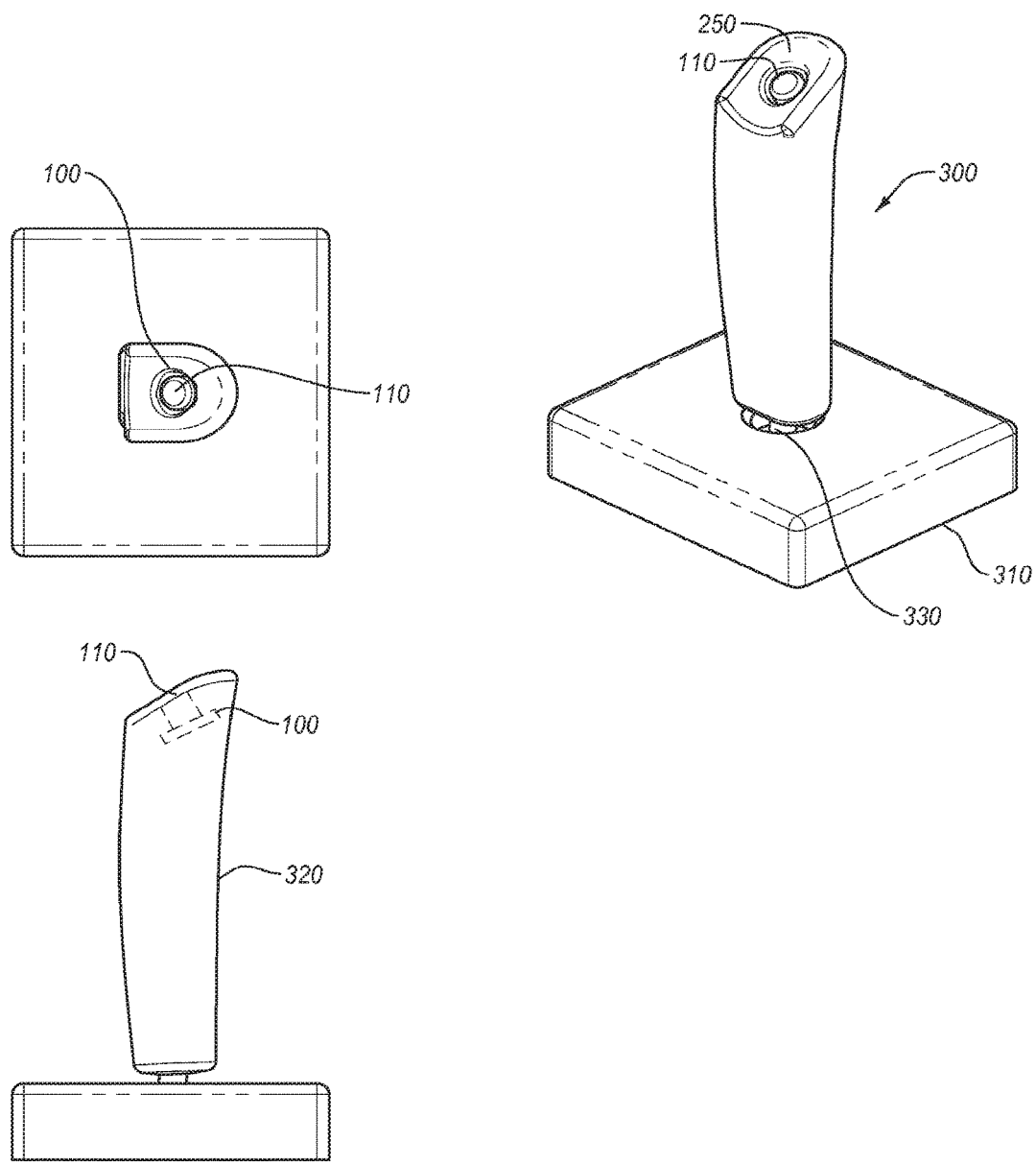
FIG. 13 illustrates an embodiment of a multidirectional controller with shear feedback, including a saddle-configured well (thumb saddle), having a hand-controlled movable body and one actuated tactor assembly disposed on the movable body.
Figure 16:
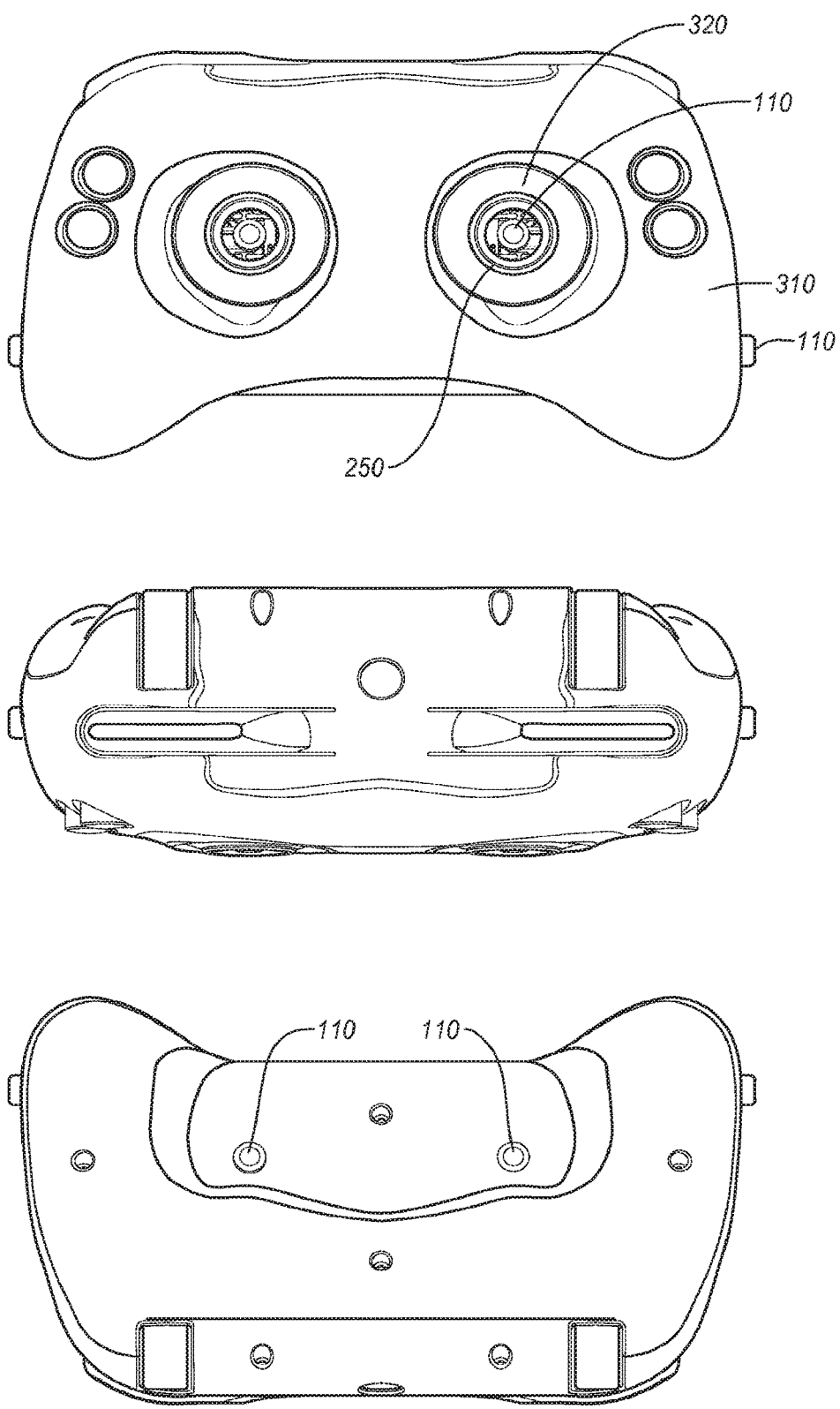
FIG. 16 illustrates an embodiment of a multidirectional controller with shear feedback, having thumb- or finger-controlled movable bodies and one or more actuated tactor assemblies disposed on the movable bodies and/or on a stationary body.
Figure 17:
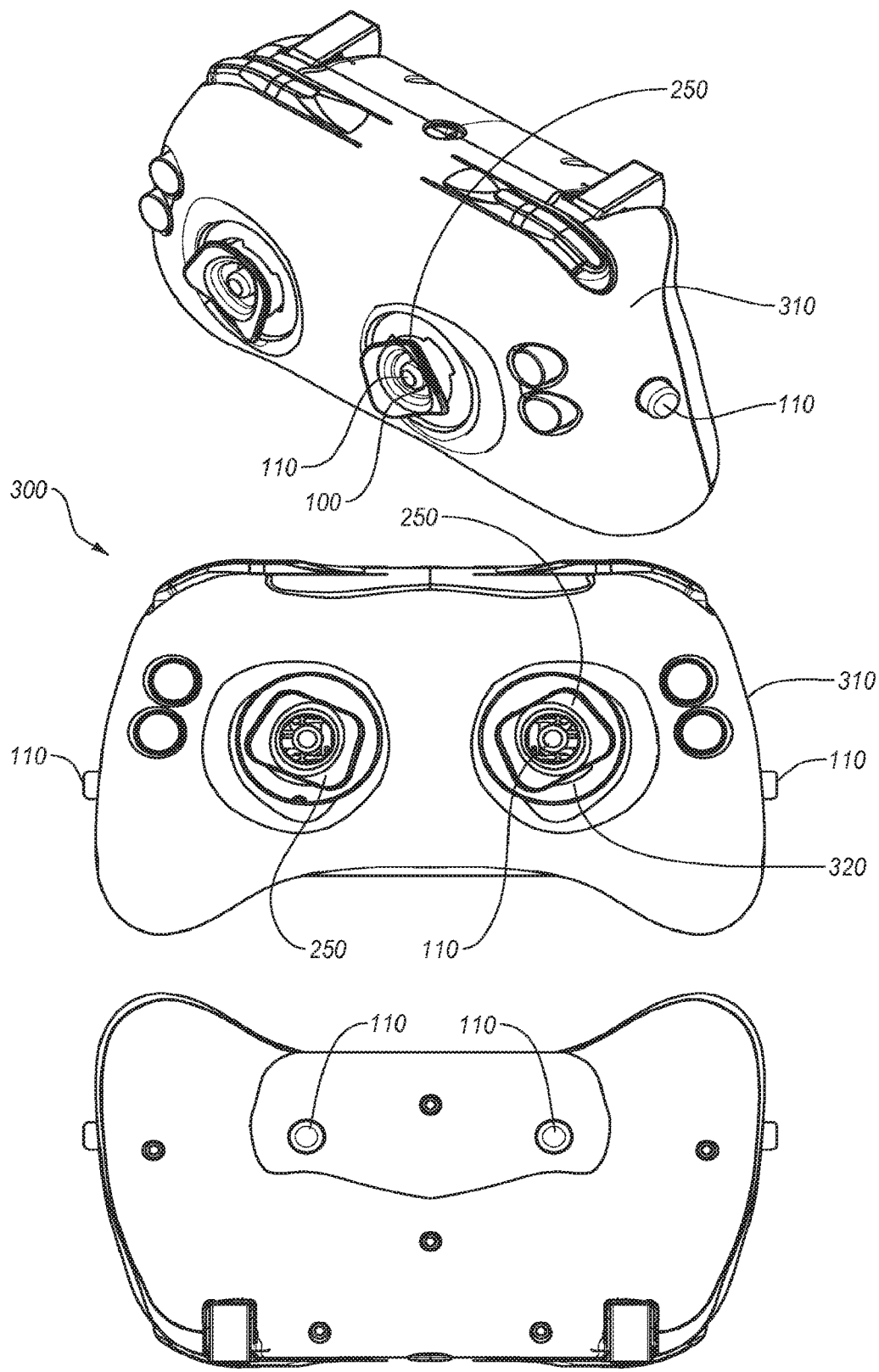
FIG. 17 illustrates an embodiment of a multidirectional controller with shear feedback, having thumb- or finger-controlled movable bodies, thumb saddles, and one or more actuated tactor assemblies disposed on the movable bodies and/or on a stationary body.

As shown in FIG. 13, in some embodiments, the invention may be a multidirectional controller with shear feedback 300, comprising a stationary body 310, a movable body 320, and an actuated tactor assembly 100, which can be placed into contact with a target area of the skin 120. The stationary body 310 can be any fixed or non-fixed object or device that is able to provide physical support to and/or have a physical connection with the movable body 320, such that the movable body has at least one degree of freedom of motion with respect to the stationary body. A stationary body may also be any fixed or non-fixed device that is able to ascertain the location or change in the location of the movable body, whether independently, through interaction with the movable body, or through interaction with a movable body and at least one other device. For example, a multidirectional controller may be a joystick (whether purely mechanical or electromechanical), game controller, a steering wheel, and/or a gear shifter. In some embodiments, a stationary body may not be in physical connections with the movable body, such as in the video game system Wii, manufactured by Nintendo®, where the stationary body is the console, and the movable body is the wireless controller (also known as the Wii remote). When a reference is made to a "stationary body," it is intended to identify any object or device with respect to which relative speed and/or displacement of another object or device (e.g., a movable body or tactor) may be measured. However, a "stationary body" may not be fixed in space and may move freely. Moreover, in some embodiments, movements of a stationary body may be detected by an outside sensor. For example, a stationary body 310 of a multidirectional controller with shear feedback 300, as shown in FIGS. 16 and 17, may be moved by a user, and a wired or wireless detector (not shown) may detect the speed and/or displacement of the stationary body 310.

In some embodiments, movement of or force exerted on the movable body 320 may be detected by at least one sensor 330. The sensor 330 may be disposed in the stationary body 310 or in the movable body 320. A variety of sensors known to those skilled in the art can be used to detect movement of or force exerted on the movable body 320. For example, a displacement transducer can be used to detect movement or displacement and a force gauge can be used to detect force exerted on the movable body. Additionally, non-contact positioning sensors, as previously described, can also be used to detect movement or displacement of the movable body 320. Hence, in some embodiments, the moveable body 320 may not be in physical contact with the stationary body 310 and/or sensor(s) 330.

Figure 15:
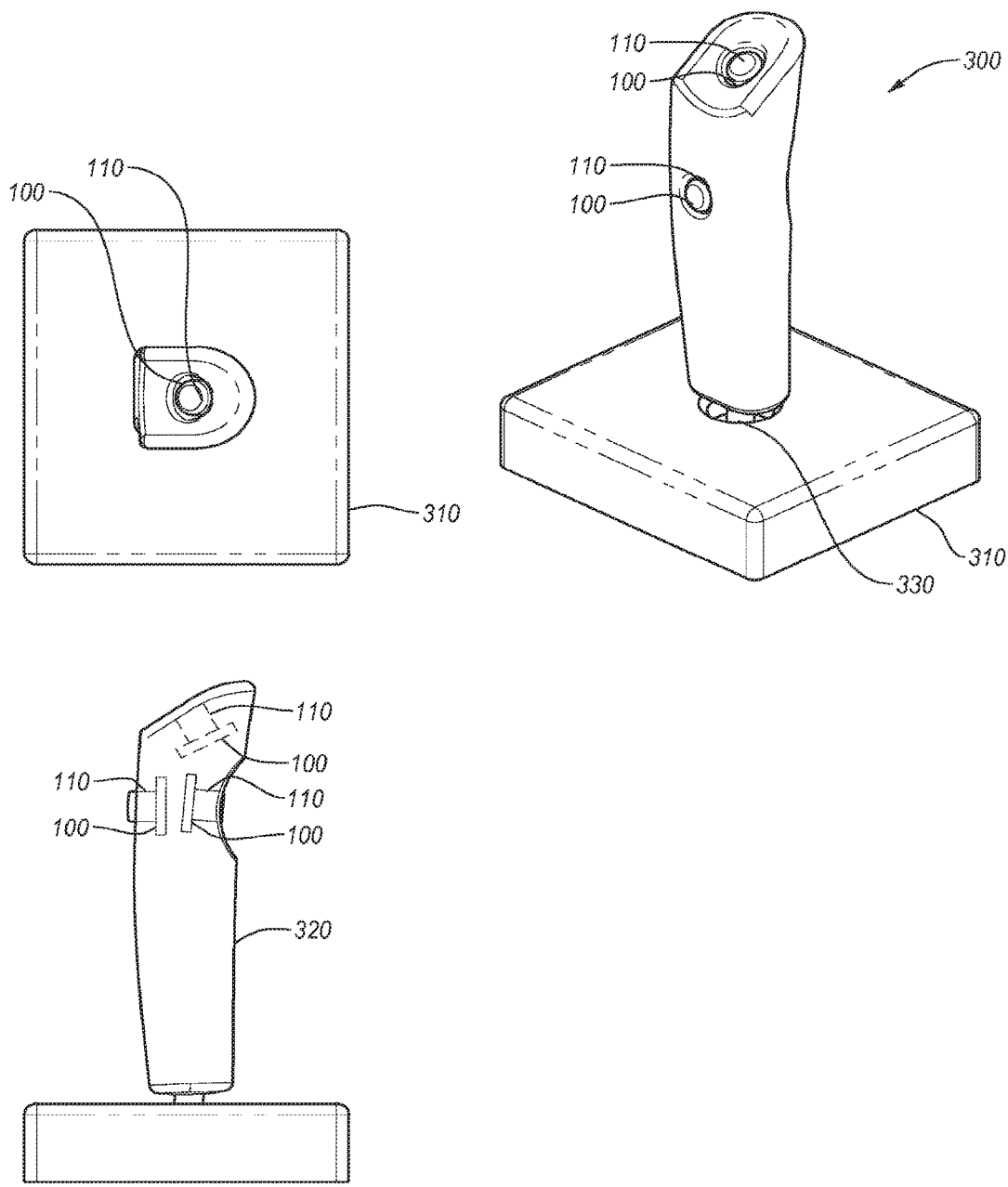
FIG. 15 illustrates an embodiment of a multidirectional controller with shear feedback, having a hand-controlled movable body and multiple tactor assemblies disposed on the movable body, wherein the tactors may contact the user's thumb, palm, and/or finger(s).

When the user operates a multidirectional controller with shear feedback 300, a target area of the skin 120 (e.g., an area on a user's finger, thumb, or palm) can be placed in contact with the tactor 110. There are numerous mechanisms known to those skilled in the art that can be used to move one or more tactor 110, and, consequently, generate a shear force on or displacement of one or more target area of the skin 120. As shown in FIG. 15, multiple tactors can be used to provide information to a user. Some of those mechanisms have been described above.

In addition to the shear feedback provided by the tactor, the movable body 320 and/or the stationary body 310 may provide haptic feedback (e.g., vibrotactile or force feedback) to a user. Means for providing such feedback are well known to those skilled in the art.

In some embodiments, one or more actuated tactor assembly 100 may receive movement instructions from one or more computer system. A movement instruction may indicate distal displacement along one or more axis as well as the speed at which the tactor should travel along each axis. Additionally or alternatively, the actuated tactor assembly 100 may comprise at least one sensor 350, as shown in FIGS. 5, 6, 19, 19A, and 19B, such as force and/or motion sensors, which may detect force exerted on or displacement of the tactor. In addition, a switch may be incorporated into the actuated tactor assembly, to register when a user pushes down on the tactor, as shown in FIGS. 18B and 19B. In some embodiments, one or more computer system may receive information from at least one sensor 350, as shown in FIGS. 19 and 19A, and/or emitter 210-detector 220 pairs, as shown in FIGS. 5 and 6, indicating the force exerted on and/or displacement of one or more tactor 110.

Figure 14:
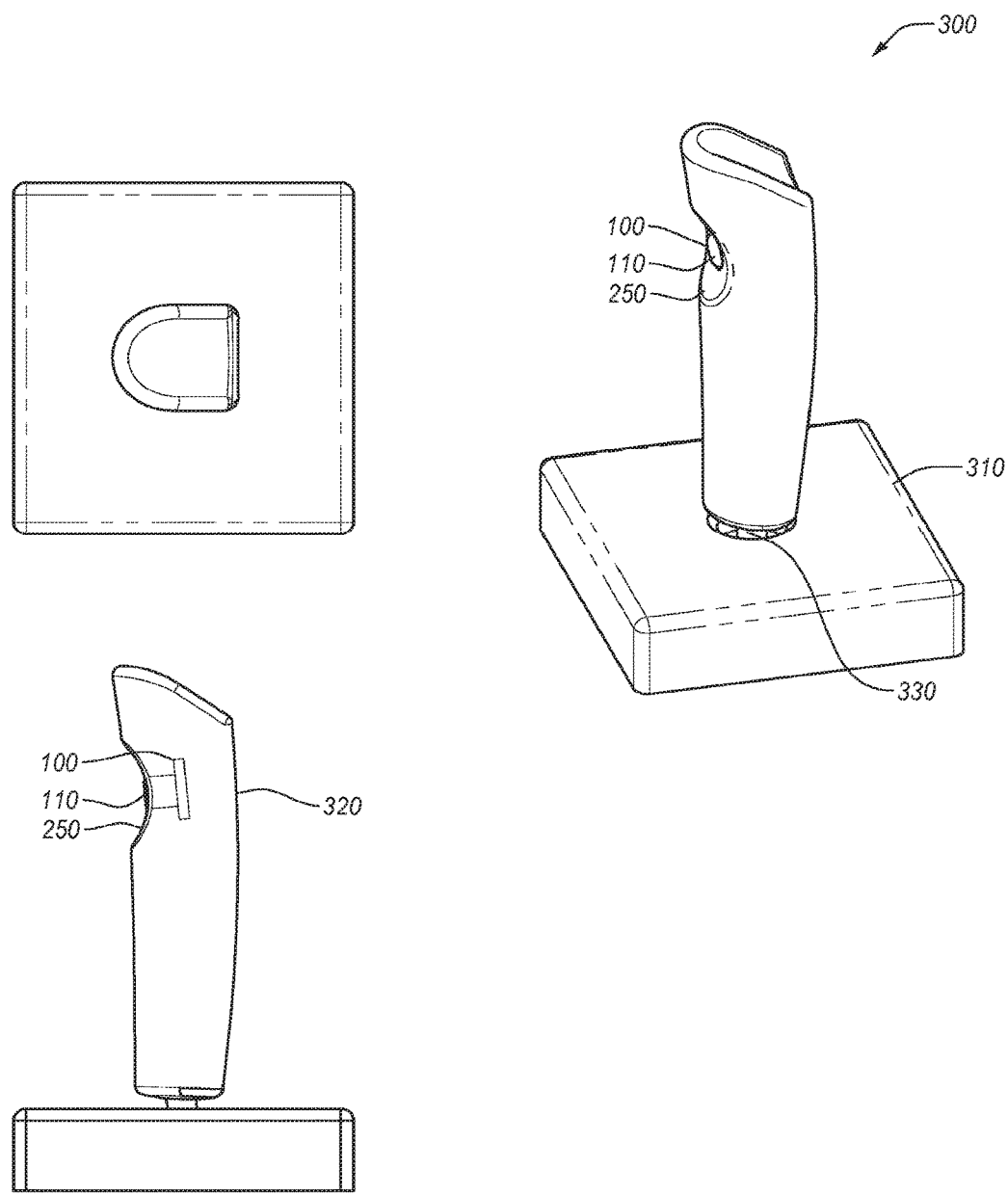
FIG. 14 illustrates an embodiment of a multidirectional controller with shear feedback, having a hand-controlled movable body and one actuated tactor assembly disposed on the side of the movable body.

As shown in FIG. 14, a multidirectional controller with shear feedback 300 also may be comprised of a movable body 320, a stationary body 310, an actuated tactor assembly 110, as described above, and a well 250, which may be designed to accommodate a target area of the skin 120 on the skin of the user's finger. The well 250 may be designed to restrain the skin adjacent to the target area on the user's finger. Restraining the skin adjacent to the target area on the user's finger will improve transmission of the shear forces. Improved transmission of shear forces results in improved transmission of the information intended to be communicated to the user.

In another embodiment, as shown in FIG. 15, a multidirectional controller with shear feedback 300 may be comprised of a stationary body 310, a movable body 320, multiple tactor assemblies 100, and one or more corresponding wells 250. Tactors 110 may be positioned to come into contact with one or more target areas on a user's skin. The one or more target areas 120 may be located on a finger, thumb, palm, and/or wrist of the user. Advantages and the manner of restraining skin adjacent to the target area of the skin 120 are the same as described above in connection with the embodiments illustrated in FIGS. 13 and 14. FIG. 15 shows an additional tactor from those shown in FIGS. 13 and 14, which is pointed out the back of the device handle to interface with the user's palm. Note that the act of gripping the controller's handle in FIG. 15 can provide restraint of the skin on the user's palm. Similarly, restraint is also provided on the skin of the palm when gripping the handle of the game controllers shown in FIGS. 16 and 17, to provide skin restraint near the tactors located on the sides of the controller.

In addition to the actuated tactor assembly 100, the movable body 320 may have a well 250. One or more tactor 110 may be disposed within a well 250. The top surface of a tactor 110 or tactor pad 111 may protrude above or may be recessed below the bottom surface of the well 250. The actuated tactor assembly 100, tactor 110, and/or tactor pad 111 may be spring loaded, such as to be pressed against a target area when the skin adjacent to the target area is in contact with the well 250.

As shown in FIGS. 16 and 17, the multidirectional controller with shear feedback 300 may comprise two thumb- or finger-controlled movable bodies 320, and actuated tactor assemblies, with tactors 110, which may be disposed within or accessible through the movable bodies 320. Additionally or alternatively, tactors 110 may be disposed on the stationary body 310 and may come into contact with the user's fingers, thumbs, and/or palms.

In some embodiments, as shown in FIGS. 16 and 17, a multidirectional controller with shear feedback 300 may comprise at least one stationary body 310, a plurality of movable bodies 320, and one or more actuated tactor assembly 100, which can be disposed on the movable body 320 and/or stationary body 310. For example, one or more actuated tactor assembly 100 may be disposed within gimbaled thumb joysticks or buttons (movable bodies 320), such that one or more target area of the skin 120 on user's thumbs or fingers comes into contact with at least one tactor 110. Additionally or alternatively, one or more actuated tactor assembly 100 may be disposed on the sides of the stationary body 310, such that one or more target area of the skin 120 on the user's hands comes into contact with at least one tactor 110. One or more actuated tactor assembly 100 may also be placed on the bottom of the controller 300, such that one or more target area of the skin 120 on the user's hands or fingers comes into contact with at least one tactor 110.

A movable body 320 may be disposed in physical connection with a stationary body 310, such that the movable body 320 has at least one degree of freedom of motion with respect to the stationary body 310. In some embodiments, a movable body 320 may be disposed on a gimbal mounted on the stationary body 310. Various ways of mounting and centering a gimbaled movable body are known to those skilled in the art. For example, a gimbal may be centered with the aid of torsion springs positioned concentrically with the axes of the gimbal's rotation.

Figure 18A:
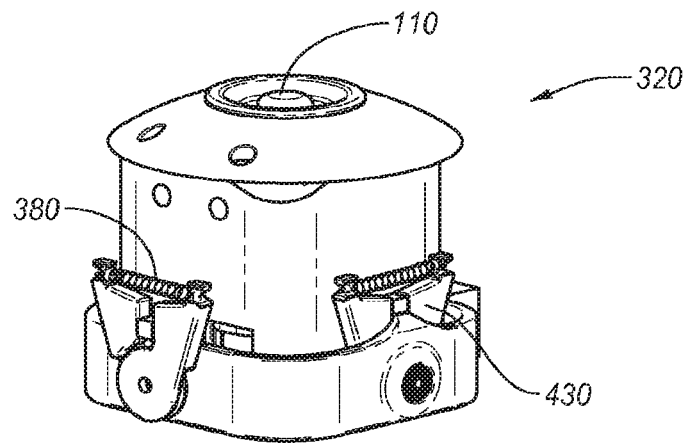
FIGS. 18A and 18B illustrate an embodiment of a mechanism for centering a movable body disposed on a gimbal.
Figure 18B:
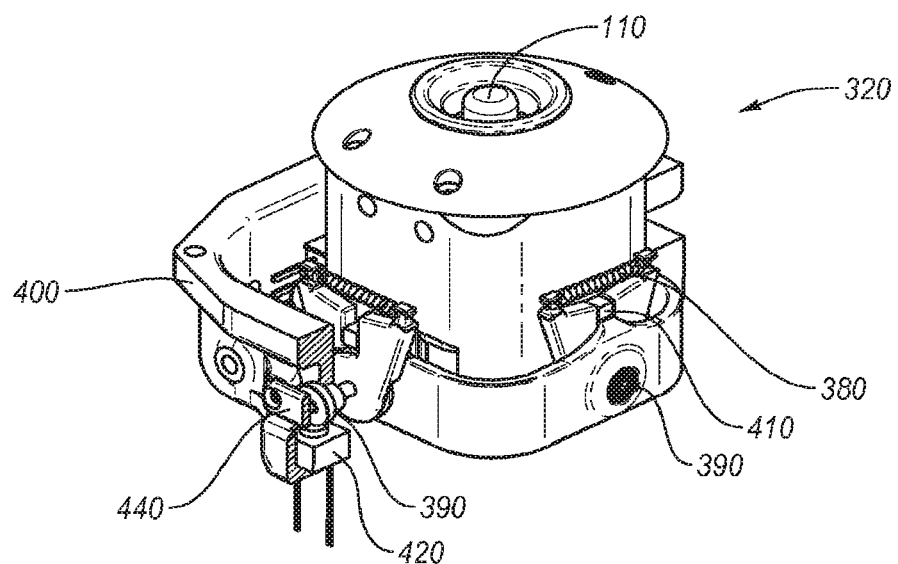

Alternatively, as shown in FIGS. 18A and 18B, a gimbal may be set in rotating rings 400 with bushings 390, and may be centered with tension (or extension) springs 380 by retracting the centering elements 430 back toward the stop block 410, when the gimbal has been moved off center. The bushings 390 may be secured with cover plates 440. In some embodiments, a switch 420 may be placed under the bushing 390. The switch 420 may be engaged when the user presses down on the tactor 110 and/or movable body 320. When engaged, the switch 420 may send a signal to a computer system.

A multidirectional controller with shear feedback 300, as shown in FIGS. 16 and 17 may also have one or more well 250, configured to isolate a target area of the skin 120 that comes into contact with a tactor 110 disposed within the well, as described above. In some embodiments, a multidirectional controller with shear feedback 300, may further comprise a detector (not shown), capable of detecting speed, displacement, and/or change in location of the stationary body 310.

As described above, the well 250 may be designed to restrain an area of the skin adjacent to the user's target area of the skin 120. In some embodiments, as shown in FIGS. 13-17, 18A, 18B, 19 and 20, the well 250 may be configured to restrain skin adjacent to a target area of the skin 120 on the user's finger and/or thumb. Additionally or alternatively, the well 250 may be configured to restrain a user's finger and/or thumb, such that a distal phalange, intermediate phalange, and/or proximal phalange is/are immobilized. Immobilizing the skin adjacent to the target area and/or the user's one or more phalange helps to maintain user's target area in contact with the tactor as well as user's hand and/or finger in contact with the movable body. Hence, the well 250 may be designed to immobilize the user's skin and/or one or more phalange to improve transmission of shear forces onto the target area, while eliminating or reducing unwanted motion of the movable body 320 and/or stationary body 310 in response to the movement of the tactor.

The well 250 also may be configured to include a thumb saddle, finger saddle, or palm saddle to aid the well to further prevent relative motion between the well and the user's thumb, finger, and palm, respectively. FIGS. 13, 15 and 17 show typical examples of saddle-configured thumb wells. The saddle configuration of the well 250 may al low more surface area of the user's skin, which is adjacent to the target area, to come into contact with the well. Contact with additional surface area of the skin provides an improved restraint of the skin as well as improved control capabilities and comfort for the user. For example, as illustrated in FIG. 17, the saddle-configured well 250 may be fitted around the user's thumb. In this configuration, the well 250 would restrain the skin adjacent to the target area as well as generally help maintain the user's thumb in contact with the movable body.

In some instances, the saddle-configured well 250 may have one or more raised edges, such that the user's thumb or finger would be centered in a predetermined location. For example, two opposing symmetrically raised edges of a substantially rectangular well 250, as shown in FIG. 17, would guide the user's thumb or finger toward the center of the well 250. A tactor 110 may be disposed in the center of the well 250, to contact the user's skin when the user's thumb or finger is placed in contact with the well.

Although in some embodiments, a restraint may be a well 250, the skin also may be restrained when the user grips the controller in a manner that would prevent the controller from moving in response to the movement of the tactor. For example, as shown in FIG. 16, the stationary body 310 in combination with the user's grip thereon function as a restraint and isolate the target area of the user's skin that is in contact with the tactor 110 for the tactors 110 that are on the sides of the stationary body 310. The user's grip also functions as a restraint to isolate the target area of the user's skin that is in contact with a tactor 110 on the side of the movable body 320 in FIG. 15.

In some embodiments, a multidirectional controller with shear feedback 300, which has more than one actuated tactor assembly, may provide directional information about a three-dimensional space. For example, two of the tactor assemblies shown in FIG. 15, one positioned to be in contact with a target area on the user's palm (or the one contacted by the finger) and another positioned to be in contact with a target area on the user's thumb, can provide such information about a three-dimensional space; one actuated tactor assembly may provide information related to X-axis and Y-axis, and the other actuated tactor assembly would provide information related to Y-axis and Z-axis; alternatively, one of the tactors may provide information only related to an axis that is not covered by the other tactor.

Alternately or in addition, a multidirectional controller with shear feedback 300, which has more than one actuated tactor assembly, may convey different information types at specific tactor 110 locations. For example, as shown in FIGS. 16 and 17, one could convey direction information concerning where a user should move with shear feedback direction cues on the tactor 110 on the left thumb joystick, while presenting information on where the user should look with shear feedback direction cues from the tactor 110 on the right thumb joystick. Furthermore, shear feedback from tactors 110 on the sides of these controllers could correspond to the health of a user's game character.

In addition to or in lieu of directional cues about three-dimensional space, the multidirectional controller with shear feedback 300, which has multiple factors 110, may provide other information via variety of movement patterns described above.

In some embodiments, a multidirectional controller with shear feedback 300 may comprise at least one stationary body 310 and one or more actuated tactor assembly 100, as shown in FIGS. 16, 17, 19 and 20. An actuated tactor assembly may comprise a sensor 350, capable of detecting force exerted on and/or displacement of the tactor 110. Additionally, a multidirectional controller with shear feedback 300 may further comprise one or more well 250. In some embodiments, one or more actuated tactor assembly may be disposed within one or more well 250. Furthermore, one or more well 250 may be configured to isolate the motion of a target area of the skin 120 to correspond to the motion of the tactor 110, located within such well, as described above.

Figure 20:
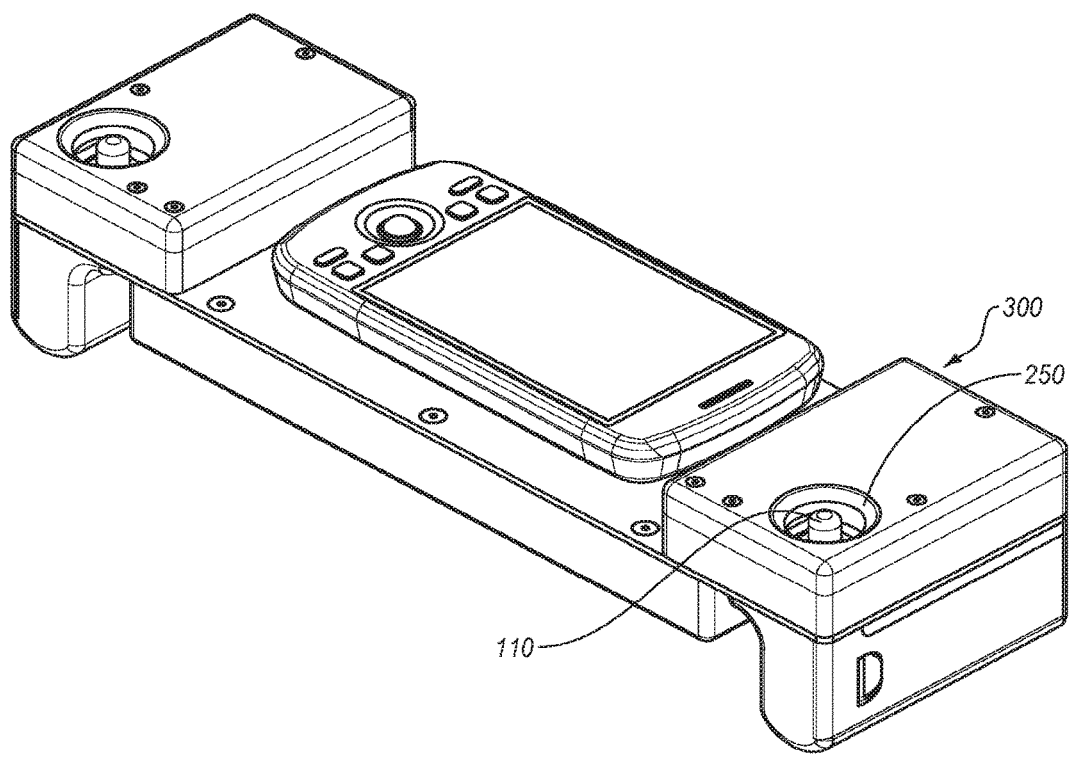
FIG. 20 illustrates a mobile device controller dock, which utilizes two actuated tactor assemblies, each having a force and/or displacement sensor(s).

Furthermore, the device depicted in FIG. 20, can utilize force inputs from the user to reposition the location of each tactor 110. For example, the motion of a tactor 110 could be programmed to imitate natural phenomena such as a spring, damper, inertia, or a collision. Such behaviors have been successfully programmed into applications which create an intuitive interface for portraying motion in document browsing and video games. Tactile shear display direction (or other) cues can be superimposed on top of the above programmed tactor behavior, hence creating a hybrid of tactor behaviors. The user is able to maintain proper finger/thumb restraint, for the communication of the provided tactile cues, by maintaining contact between their thumb and some portion of the thumb well 250.

Various actuators may be used to generate movement of the tactor 110. As shown in FIGS. 19A and 19B, servo motors 360 or stepper motors may be used to move the tactor 110. Additionally, a movable stage 370 may be used in connection with the motors 360 and the tactor 110. The motors 360 may be controlled by a computer system (not shown).

The scope of the invention is not limited to the aforementioned example embodiments. Moreover, a person of ordinary skill in the art will understand that aspects of one or more of the foregoing example embodiments may be combined with aspects of one or more other of the foregoing examples to define yet further embodiments within the scope of the invention. It should also be noted that nothing herein constitutes, or should be construed as constituting, a 'critical' or 'essential' element of any particular embodiment, or group of embodiments.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A multidirectional controller with shear feedback, comprising:
    a body;
    a first tactor disposed in connection with the body, such that the first tactor has at least one degree of freedom of motion with respect to the body and is operable to engage a first target area of a user's skin;

a first opening defined in an outer surface of the body, an uppermost portion of a first contact surface of the first tactor being within the first opening or recessed below the first opening;

a first actuator capable of moving the first tactor;

a second tactor disposed in connection with the body and oriented in a different direction than the first tactor, such that the second tactor has at least one degree of freedom of motion with respect to the body and is operable to engage a second target area of a user's skin;

a second opening defined in the outer surface of the body, an uppermost portion of a second contact surface of the second tactor being within the second opening or recessed below the second opening; and a second actuator capable of moving the second tactor.

2. The controller of claim 1, wherein the first tactor and the second tactor are capable of moving in at least two axes.

3. The controller of claim 2, wherein the first tactor includes at least one axis transverse to an axis of the second tactor, the first tactor and the second tactor configured to work in concert to provide information about a three-dimensional space.

4. The controller of claim 1, wherein the first opening and the second opening include a saddle-configured well, the saddle-configured well configured to guide a portion of the user's skin to a specific location.

5. The controller of claim 1, further comprising at least one sensor capable of detecting a change in position of or force applied to the body.

6. The controller of claim 5, further comprising a computer system capable of receiving information from the at least one sensor and of sending instructions to the actuator.

7. The controller of claim 6, wherein the computer system is a mobile device.

8. The controller of claim 1, wherein the first target area of the user's skin is on a finger, a thumb, or a palm of the user, and the second target are of a user's skin is in a different location, on a finger, a thumb, or a palm of the user.

* * * * *